(12) United States Patent
Ichikawa et al.

(10) Patent No.: US 7,034,429 B2
(45) Date of Patent: Apr. 25, 2006

(54) STATOR FOR VEHICULAR ROTARY ELECTRIC MACHINE AND A MANUFACTURING METHOD THEREOF

(75) Inventors: Masao Ichikawa, Nukata-gun (JP); Yasunori Kitakado, Okazaki (JP); Motohiro Murahashi, Anjo (JP); Kazuhiko Fukuda, Anjo (JP); Mitsuru Kato, Maryville, TN (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/026,034

(22) Filed: Jan. 3, 2005

(65) Prior Publication Data

US 2005/0116571 A1 Jun. 2, 2005

Related U.S. Application Data

(62) Division of application No. 10/341,394, filed on Jan. 14, 2003, now Pat. No. 6,897,594.

(30) Foreign Application Priority Data

Jan. 18, 2002 (JP) .............................. 2002-009861

(51) Int. Cl.
*H02K 3/12* (2006.01)
*H02K 15/085* (2006.01)

(52) U.S. Cl. .................................................... 310/201
(58) Field of Classification Search ................ 310/201, 310/208
See application file for complete search history.

(56) References Cited

U.S. PATENT DOCUMENTS

| | | | |
|---|---|---|---|
| 1,789,129 A | 1/1931 | Apple | |
| 1,834,926 A | 12/1931 | Apple | |
| 5,619,088 A | 4/1997 | Yumiyama et al. | |
| 5,952,749 A | 9/1999 | Umeda et al. | |
| 5,998,903 A | 12/1999 | Umeda et al. | |
| 6,249,956 B1 | 6/2001 | Maeda et al. | |
| 6,333,573 B1 * | 12/2001 | Nakamura | 310/45 |
| 6,388,358 B1 * | 5/2002 | Umeda et al. | 310/201 |
| 6,492,757 B1 | 12/2002 | Nakamura et al. | |
| 6,498,414 B1 | 12/2002 | Asao | |
| 6,501,206 B1 | 12/2002 | Oohashi et al. | |
| 6,897,594 B1 * | 5/2005 | Ichikawa et al. | 310/201 |
| 2002/0053126 A1 | 5/2002 | Maeda et al. | |

FOREIGN PATENT DOCUMENTS

| | | |
|---|---|---|
| EP | 1 005 137 A1 | 5/2000 |
| JP | A-54-66406 | 5/1979 |
| JP | A-60-170448 | 9/1985 |
| JP | A-8-205446 | 8/1996 |
| JP | A-2000-278920 | 10/2000 |
| JP | A-2001-292545 | 10/2001 |
| JP | A-2002-095198 | 3/2002 |

* cited by examiner

Primary Examiner—Tran Nguyen
(74) Attorney, Agent, or Firm—Oliff & Berridge, PLC

(57) ABSTRACT

To secure insulation between electrical conductors at a coil end, a first electrical conductor at one coil end is arranged so as to intersect a radially adjacent second electrical conductor at one point or more. The electrical conductor is formed with radial indentations in side faces that are opposite side faces in opposing electrical conductors at any of the intersecting portions, the indentations having depths that increase toward the near ear of the electrical conductors. Sufficient clearances are thereby secured between electrical conductors in their intersecting portions near their ends where the insulating films are susceptible to damage because of welding heat. Electrical insulation is thus ensured, and the cooling efficiency at the coil end is improved.

5 Claims, 21 Drawing Sheets

STATOR FOR VEHICULAR ROTARY ELECTRIC MACHINE AND A MANUFACTURING METHOD THEREOF

CROSS REFERENCE TO RELATED APPLICATIONS

This is a Division of application Ser. No. 10/341,394 filed Jan. 14, 2003 now U.S. Pat. No. 6,897,594. The entire disclosure of the prior applications are hereby incorporated by reference herein in their entirety.

This application is based upon, claims the benefit of priority of, and incorporates by reference the contents of prior Japanese Patent Application No. 2002-9861 filed Jan. 18, 2002.

BACKGROUND OF THE INVENTION

1. Field of the Invention

The present invention relates to a vehicular rotary electric machine, such as an AC generator for example, that is mountable on cars and trucks.

2. Description of Related Art

Generally, many cars are being designed with slanting hoods to minimize aerodynamic drag. Additionally, cars are also being designed with smaller engine compartments in order to provide greater interior space. As a result, there is increasingly less space available for mounting AC generators within the vehicle engine compartments. Meanwhile, increasingly lower engine revolutions (rpm) achieve increasingly better fuel economy, but reducing engine rpm also reduces the rpm of the vehicular AC generator. On the other hand, the need for increasingly higher power outputs of vehicular AC generators are increasingly greater because of the increased electrical loads created by controllers of safety features and other electrical loads. Thus a small high-power and low-cost vehicular AC generator is in great demand.

Another problem is that fan noise and magnetic noise of a supplementary machine such as the vehicular AC generator, which is driven at a relatively high speed, has become more and more bothersome. This is because engine noises have been greatly reduced in recent years in response to social demands for less traffic noise and in order to enhance commercial value of cars by making the interiors more quiet. A typical stator winding used in a conventional vehicular AC generator adopts a structure in which continuous wires are wound around a stator core. Additionally, various improvements to the stator windings have been proposed to meet the above-described demands of compactness, high power output, and low noise.

For example, Japanese Patent Laid-Open Publication No. Sho 54-66406 discloses inserting a collective winding successively into the slots of the stator from outer layers, so as to prevent the stator winding from crossing at one coil end and becoming long. With this structure, however, although the wires do not cross each other at one coil end as they are inserted from outer layers towards inner layers of the slots in succession, there arises another problem in that there is a dead space within the slots since the outer layers of the winding are arranged on the outer side and the inner layers on the inner side in the slots. On the other hand, an attempt to fill the slots with coils so as not to leave any dead space would result in the wire layers crossing each other between the inside of the slots and the coil end.

To overcome the problem of intersection of the winding at the coil end and within the slots, Japanese Patent No. 2927288 proposes a technique which adopts a stator winding constructed of a plurality of conductor segments in order to increase the space filling factor of the stator winding within the slots and to ensure high cooling efficiency on the outside of the slots by cooperation with the rotor. With this structure, the ends of a plurality of conductor segments are bonded together by welding to form a stator winding. The bond areas are therefore heated to a high temperature during the welding, and so is the vicinity of the bond areas because of the heat conduction. As a result, the insulation films near the bond areas become deteriorated by the heat stress, and the lessened adhesion of the films to the conductors result in peeling and cracking in the films. Conductor segments with peeled or cracked insulation film may cross each other and cause short circuits, since they are in close proximity to each other. Car vibrations and the like can also bring about short-circuiting across the conductor segments at the coil end near the bond areas because the insulation film may become damaged by friction or mechanical shock due to the contact.

In view of these problems, the applicant of the present invention has proposed, in Japanese Patent Laid-Open Publication No. 2000-166148, a technique to provide clearances between the conductor segments that radially adjoin and intersect each other at the coil end by forming radial indentations in the conductor segments at the intersecting points. The cross-sectional area of the conductor segment remains unchanged even in the indentation, since the corner radius of the rectangular cross section of the conductor segment is large enough to absorb the displacement of material when forming the indentation by pressing. In other words, the clearance provided by the formation of the indentation is defined by the corner radius of the rectangular cross section and the width of the conductor segment.

However, the design disclosed in Japanese Patent Laid-Open Publication No. 2000-166148 has the problem that, under the condition that the cross-sectional area of the conductor segment should remain the same before and after the formation of the indentation, the size of the indentation (or the depth of the indentation) becomes smaller in proportion to a decrease in the corner radius of the rectangular cross section, or to an increase in the width, of the conductor segment. If the clearances are not sufficiently large between crossing conductor segments, the insulation film may become particularly susceptible to damage by the friction or the mechanical shock due to the contact which may cause short-circuiting to occur.

SUMMARY OF THE INVENTION

In view of the problems encountered in the prior designs, it is an object of the present invention to provide a stator for a vehicular rotary electric machine and its manufacturing method, in which sufficient clearances are provided in intersecting portions of electrical conductors at one coil end so as to ensure electrical insulation and to improve the cooling efficiency at the coil end.

In order to achieve the above object, a stator for a vehicular rotary electric machine in a first aspect of the invention includes: a stator core having a plurality of slots and a multi-phase stator winding constructed of a plurality of electrical conductors connected together. The electrical conductors are accommodated radially side-by-side within the slots and are electrically insulated from each other. The electrical conductors have their ends extending to the outside of the slots and are bonded together to form a coil end. A first electrical conductor at the coil end is arranged to intersect a second electrical conductor at one point or more, while the second electrical conductor adjoins the first electrical conductor in a radial direction. A radial indentation is formed in a side face of the first electrical conductor opposite to the second electrical conductor at least at one intersecting point between the adjacent electrical conductors. The indentation has a depth that increases towards one end of the first electrical conductor.

The end portion of the first electrical conductor which will be bonded to the second, adjacent electrical conductor is susceptible to insulation film troubles such as peeling and cracking because of the heat of welding. However, since the indentation is formed in the side face of the first electrical conductor opposite to the second electrical conductor at the intersecting point, and the indentation has a depth gradually increasing towards the end thereof, sufficient clearances are secured between the electrical conductors at their intersecting portion near the ends. Electrical insulation is thereby ensured, and the cooling efficiency at the coil end is improved.

A stator for a vehicular rotary electric machine according to a second aspect of the invention includes a stator core having a plurality of slots and a multi-phase stator winding constructed of a plurality of electrical conductors connected together. The electrical conductors being accommodated radially side-by-side within the slots and electrically insulated from each other. Additionally, they have their ends extend to the outside of the slots and are bonded together to form a coil end, such that a first electrical conductor at the coil end is arranged to be mounted in the stator core in a twisted condition and to intersect a second electrical conductor at one point or more in its twisted portion. The second electrical conductor adjoins the first electrical conductor in a radial direction, and a radial indentation is formed in a side face of the first electrical conductor opposite to the second electrical conductor at any of the intersecting points.

The first electrical conductor is mounted in the stator core in a twisted condition at the coil end and intersects the second radially adjacent electrical conductor at one point or more in its twisted portion. The radial indentation is formed in the side face of the first electrical conductor opposite to the second electrical conductor at the intersecting point. Even when the first electrical conductor is twisted, its radial thickness is kept small. Therefore, a sufficient clearance is secured between the electrical conductors which ensures electrical insulation and improves cooling efficiency at the coil end.

The stator for a vehicular rotary electric machine according to a third aspect has a side face of the first electrical conductor and a side face of the second electrical conductor that face each other in a skewed attitude at the intersecting point. The radial indentation is provided in the skewed opposing side face of the electrical conductor.

The radial indentation is provided in the skewed opposing side face of the electrical conductor taking account of the fact that the side face of the first electrical conductor and the side face of the second electrical conductor face each other in a skewed attitude. Therefore, even when the one electrical conductor is twisted, its radial thickness is kept small. Accordingly, a sufficient clearance is secured between electrical conductors, whereby electrical insulation is ensured, and the cooling efficiency at the coil end is improved.

The stator for a vehicular rotary electric machine according to a fourth aspect has a twisted portion that is twisted back in an opposite direction at the intersecting point so that the side face of the first electrical conductor is faced in substantially parallel to the side face of the second electrical conductor. The radial indentation is then provided in the parallel opposite side faces of the electrical conductor.

So the twisted portion of the electrical conductor is twisted back in the opposite direction so that the side face of the one electrical conductor is faced substantially parallel to the side face of the other electrical conductor. The radial indentation is provided in the opposite, parallel side face of the electrical conductor. Accordingly, even when one electrical conductor is twisted, its radial thickness is kept small. Therefore, a sufficient clearance is secured between electrical conductors, which ensures electrical insulation, and the cooling efficiency at the coil end is improved.

A stator for a vehicular rotary electric machine according to a fifth aspect includes a stator core having a plurality of slots and a multi-phase stator winding constructed of a plurality of electrical conductors connected together. The electrical conductors are accommodated radially side-by-side within the slots and are electrically insulated from each other. They have their ends extending to the outside of the slots and are bonded together to form a coil end such that a first electrical conductor at the coil end has a bond area at its end to be bonded to a second electrical conductor. The second electrical conductor adjoins the first electrical conductor in a radial direction. The bond area is provided with a protrusion that protrudes towards a bond area of the other electrical conductor.

Since the first electrical conductor at the coil end has a bond area at its end to be bonded to the second electrical conductor which radially adjacent thereto, and the end is provided with a protrusion that protrudes toward a bond area of the second electrical conductor. The other portions of the first electrical conductor are kept apart from the second electrical conductor other than the end to be bonded to the second electrical conductor to provide a sufficient clearance therebetween. Electrical insulation is thereby ensured, and the cooling efficiency at the coil end is improved.

The stator for a vehicular rotary electric machine according to a sixth aspect has the protrusion formed by offsetting the end towards the bond area of the second electrical conductor. Since the protrusion is formed by offsetting the end of the first electrical conductor toward the bond area of the second electrical conductor by pressing or the like, the end of electrical conductor is brought closer to the bond area of the other electrical conductor, while the other parts of the electrical conductors other than the end are kept apart from the second electrical conductor.

The stator for a vehicular rotary electric machine according to a seventh aspect has the protrusion formed by bending the end towards the bond area of the other electrical conductor.

Since the protrusion is formed by bending the end of the first electrical conductor toward the bond area of the second electrical conductor by pressing or the like, the end of the first electrical conductor is brought closer to the bond area of the second electrical conductor, while the other parts of the electrical conductors other than the end are kept apart from the second electrical conductor.

A stator for a vehicular rotary electric machine according to an eighth aspect includes a stator core having a plurality of slots and a multi-phase stator winding constructed of a plurality of electrical conductors connected together. The electrical conductors are accommodated radially side-by-side within the slots and are electrically insulated from each other, and they have their ends extending to the outside of the slots and are bonded together to form a coil end. Additionally, a first electrical conductor accommodated in at least one layer of the slots is formed with a protrusion at its end that includes a bond area to be bonded to a second radially adjacent electrical conductor at the coil end. Another electrical conductor is accommodated in at least one of the other layers in the slots and intersects other radially adjacent electrical conductors at the coil end at one point or more and is formed with a radial indentation in its side face opposite to other electrical conductors at any intersecting portions.

A first electrical conductor accommodated in at least one layer in the slots is formed with a protrusion at its end that includes a bond area to be bonded to a second radially adjacent electrical conductor at the coil end. The protrusion that protrudes towards the bond area of the second electrical conductor is kept apart from the second electrical conductor, except its end which will be bonded to the second electrical conductor, so as to provide a sufficient clearance therebetween. Electrical insulation is thereby ensured, and the cooling efficiency at the coil end is improved.

On the other hand, a first electrical conductor accommodated in at least one of the other layers in the slots intersects a second radially adjacent electrical conductor at the coil end at one point or more and is formed with a radial indentation in its side face opposite to the second electrical conductor at any of its intersecting portions. Therefore, a sufficient clearance is provided between the electrical conductors in the intersecting portion. Electrical insulation is thereby ensured, and the cooling efficiency at the coil end is improved.

The stator for a vehicular rotary electric machine according to a ninth aspect has at least one layer that is either an innermost or an outermost layer in the slots, and the at least one of the other layers is a layer other than the innermost and the outermost layers in the slots.

So one electrical conductor in the innermost or outermost layer of the slots is formed with, at its end, a protrusion protruding towards a second electrical conductor but with no indentations. Indentations cause the edges of the electrical conductor to become sharper. Therefore, there is no risk of electrical conductors being caught in the insulation material and becoming bent when being inserted into the slots. They can thus be smoothly inserted into the slots.

According to a manufacturing method of a stator for a vehicular rotary electric machine according to a tenth aspect, the stator includes a stator core having a plurality of slots, and a multi-phase stator winding. The stator is constructed of a plurality of electrical conductors connected together. The electrical conductors are accommodated radially side-by-side within the slots and are electrically insulated from each other, and have their ends extending to the outside of the slots and are bonded together to form a coil end.

The manufacturing method of this stator has the following steps: a step of forming an indentation in the radial direction in a side face of each of the electrical conductors by pressing; a step of inserting the plurality of electrical conductors in a radially side-by-side relationship with each other in the slots; a step of bending each of the electrical conductors and radially adjacent electrical conductors in different circumferential directions by a predetermined pole pitch such that the indentations formed in respective side faces of the adjacent electrical conductors intersect each other in a face-to-face relationship; and a step of bonding one end of each of the electrical conductors to one end of the adjacent electrical conductors.

Therefore, in the indentation-forming step, indentations are formed in a radial direction in side faces of each of the electrical conductors by pressing. In the insertion step, the plurality of electrical conductors are inserted in the slots in a radially side-by-side relationship with each other. In the bending step, each of the electrical conductors and radially adjacent electrical conductors are bent in different circumferential directions by a predetermined pole pitch such that the indentations formed in respective side faces of the adjacent electrical conductors intersect and face each other. In the bonding step, one end of each of the electrical conductors is bonded to one end of the adjacent electrical conductors. Therefore, radially adjoining electrical conductors are formed with indentations in their side faces such that these indentations cross each other in a face-to-face relationship. Therefore, the radial thickness of the electrical conductors at their intersecting portions is made smaller, whereby clearances between electrical conductors are readily and reliably secured.

The manufacturing method of a stator for a vehicular rotary electric machine according to an eleventh aspect has indentations that are provided by pressing such that their depth increases towards one end of the electrical conductors.

The end portion of a first electrical conductor at a coil end which is bonded to a second electrical conductor is particularly susceptible to insulation film troubles because of the heat of welding. However, since the indentation formed in the first electrical conductor has a depth that gradually increases towards the end, a sufficient clearance is secured between the electrical conductors in the intersecting portion near the ends. Electrical insulation is thereby ensured, and the cooling efficiency at the coil end is improved. Also, even when the electrical conductor has a small radius in the corners of the rectangular cross section, or even when the conductor segment has a large width, the indentation is readily and reliably secured with a sufficient depth near the end of the electrical conductor.

The manufacturing method of a stator for a vehicular rotary electric machine according to a twelfth aspect has, in the bending step, electrical conductors that are clamped at their ends and bent so as to be twisted. The bending step includes an additional step of twisting back the electrical conductors in an opposite direction at the intersecting point between the radially adjacent electrical conductors so that the indentations face the indentations of the radially adjacent electrical conductors in a substantially parallel face-to-face relationship with each other.

Therefore, even when the electrical conductors are twisted, the opposing indentations are made substantially parallel to each other by being twisted back in the intersecting portions. Accordingly, the radial thickness is kept small, and sufficient clearances are secured between electrical conductors at their intersecting portions.

DETAILED DESCRIPTION OF THE PREFERRED EMBODIMENTS

Various embodiments of a stator for a vehicular rotary electric machine and its manufacturing method, when applied to a vehicular AC generator, will be described with reference to the drawings.

(First Embodiment)

Figure 1:
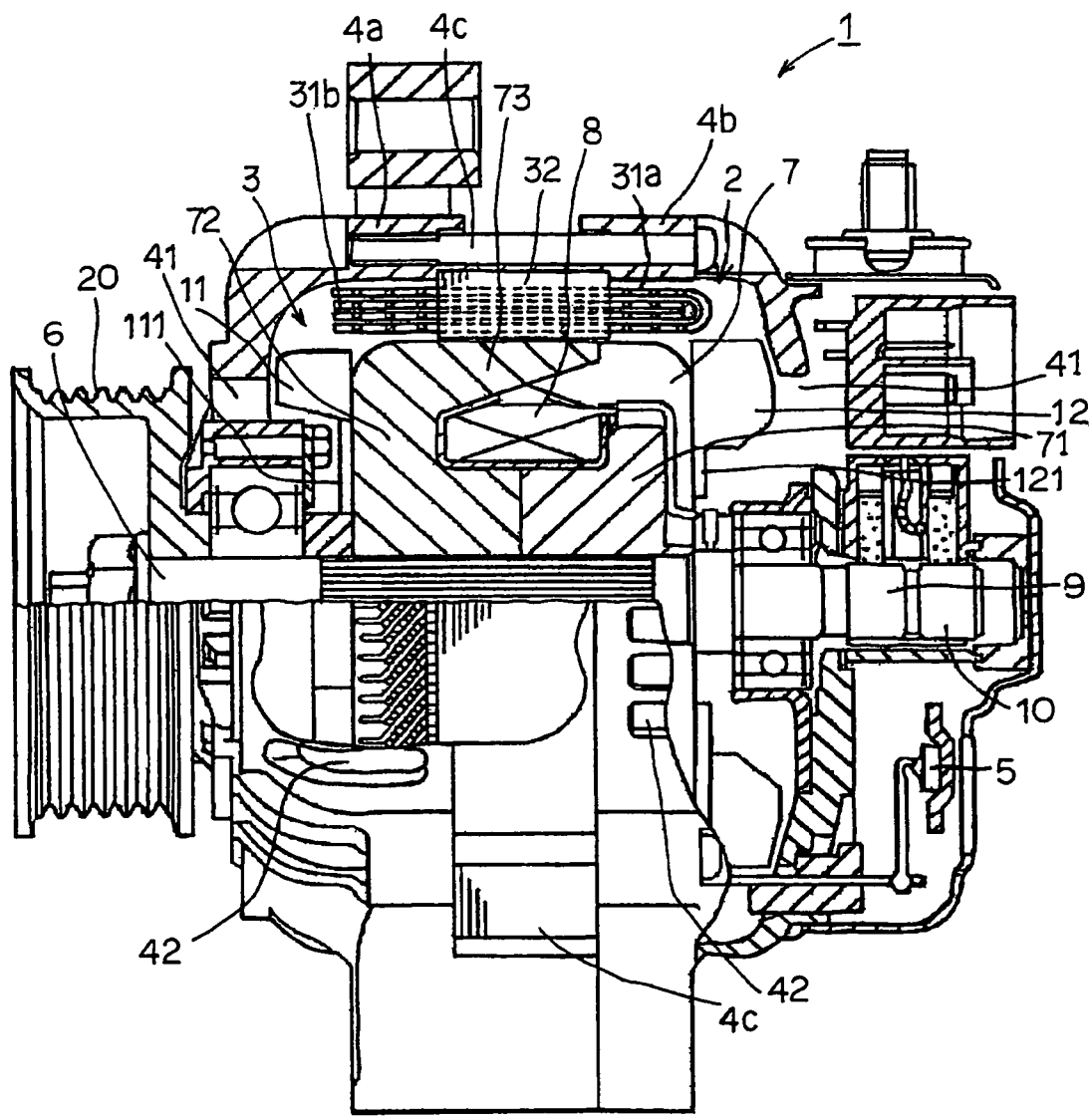
FIG. 1 is a cross-sectional view of a vehicular AC generator according to a first embodiment of the present invention.

FIGS. 1 through 7 illustrate a first embodiment of the present invention, FIG. 1 is a cross-sectional view of major parts of a vehicular AC generator and FIGS. 2 through 7 are explanatory diagrams of the stator in this embodiment.

Vehicular AC generator 1 includes a stator 2 that functions as an armature, a rotor 3 as a field coil, a front housing 4a and a rear housing 4b supporting the rotor 3 and fixing the stator 2 from both sides with fastening bolts 4c, and rectifiers 5 for converting AC power into DC power. The rotor 3 rotates integrally with a shaft 6 and includes Lundell-type pole cores 7, field coils 8, slip rings 9 and 10, and an air blowing system including a diagonal current fan 11 and a centrifugal fan 12. The shaft 6 is joined to a pulley 20 and is rotated by an engine (not shown) mounted on the vehicle.

A typical Lundell-type pole core 7 has a pair of pole cores. The Lundell-type pole core 7 includes a boss 71 assembled to the shaft 6, disks 72 extending radially from both ends of the boss 71, and twelve claw poles 73. The diagonal current fan 11 on the side of the pulley rotates integrally with the rotor 3, and has blades on a base plate 111 fixed to the end face of the pole core 7 by welding or the like. Some of these blades are arranged at an acute angle, while the others are at right angles, to the base plate 111. The centrifugal fan 12 on the opposite side of the pulley includes a base plate 121 fixed to the end face of the pole core 7 by welding or the like and blades arranged at right angles to the base plate.

The housing 4a, 4b includes air inlets 41 in one axial end face thereof. On both sides in the outer circumferential surface of the housing 4a, 4b are provided air outlets 42, which discharge cooling air, that are respectively positioned on the outside in a radial direction of a first coil-end group 31a and a second coil-end group 31b of the stator 2. The rectifiers 5 are provided at one end of the vehicular AC generator 1 on the opposite side of the pulley. That is, the first coil-end group 31a is arranged in matching positional relationship with these rectifiers 5.

The stator 2 is made up of a stator core 32 formed with slots 35, a stator winding composed of a number of electrical conductors such as copper coils fitted in the slots 35, and insulators 34 inserted between the stator core 32 and the electrical conductors for providing electrical insulation therebetween. The stator core 32 is fixedly held between the pair of front and rear housings 4a and 4b.

Figure 2:
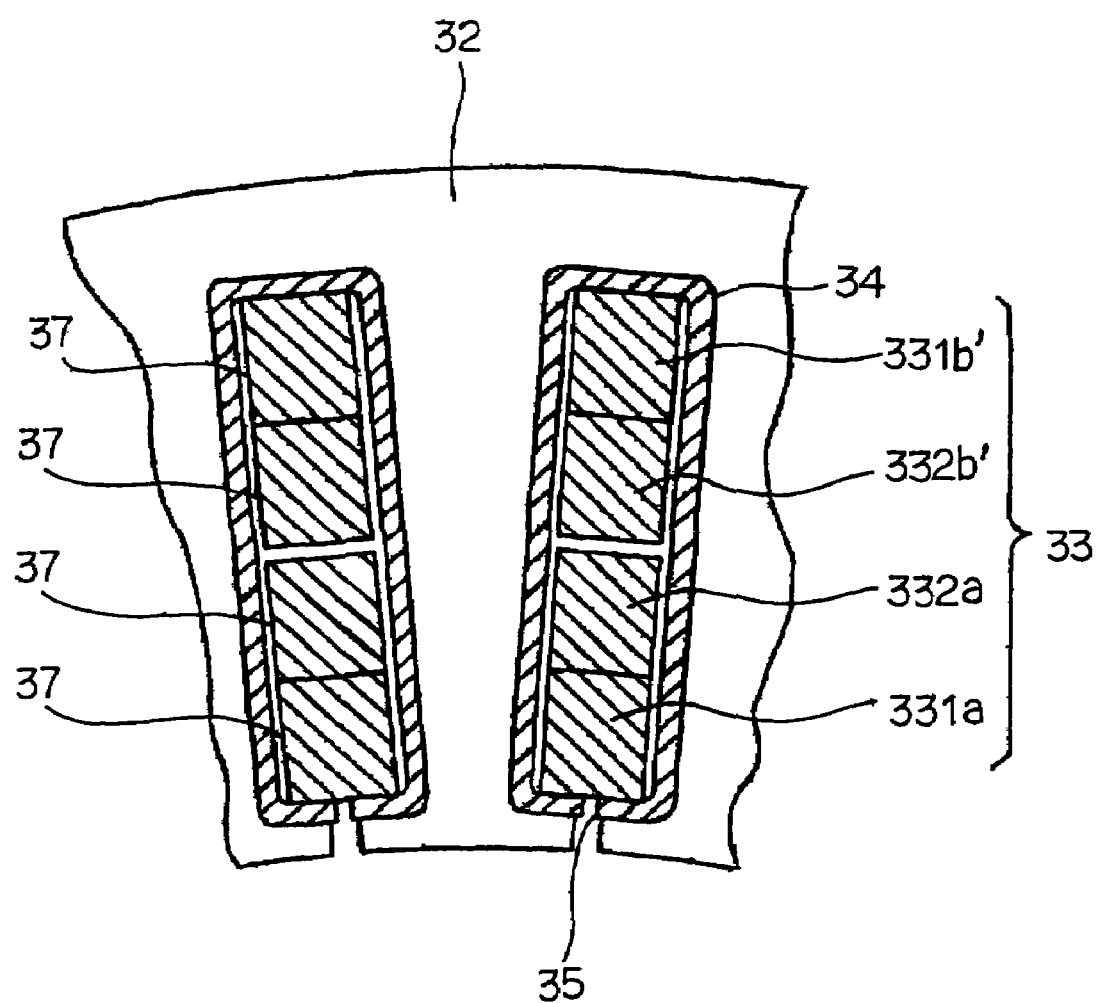
FIG. 2 is a partial cross-sectional view of a stator in a first embodiment.
Figure 3:
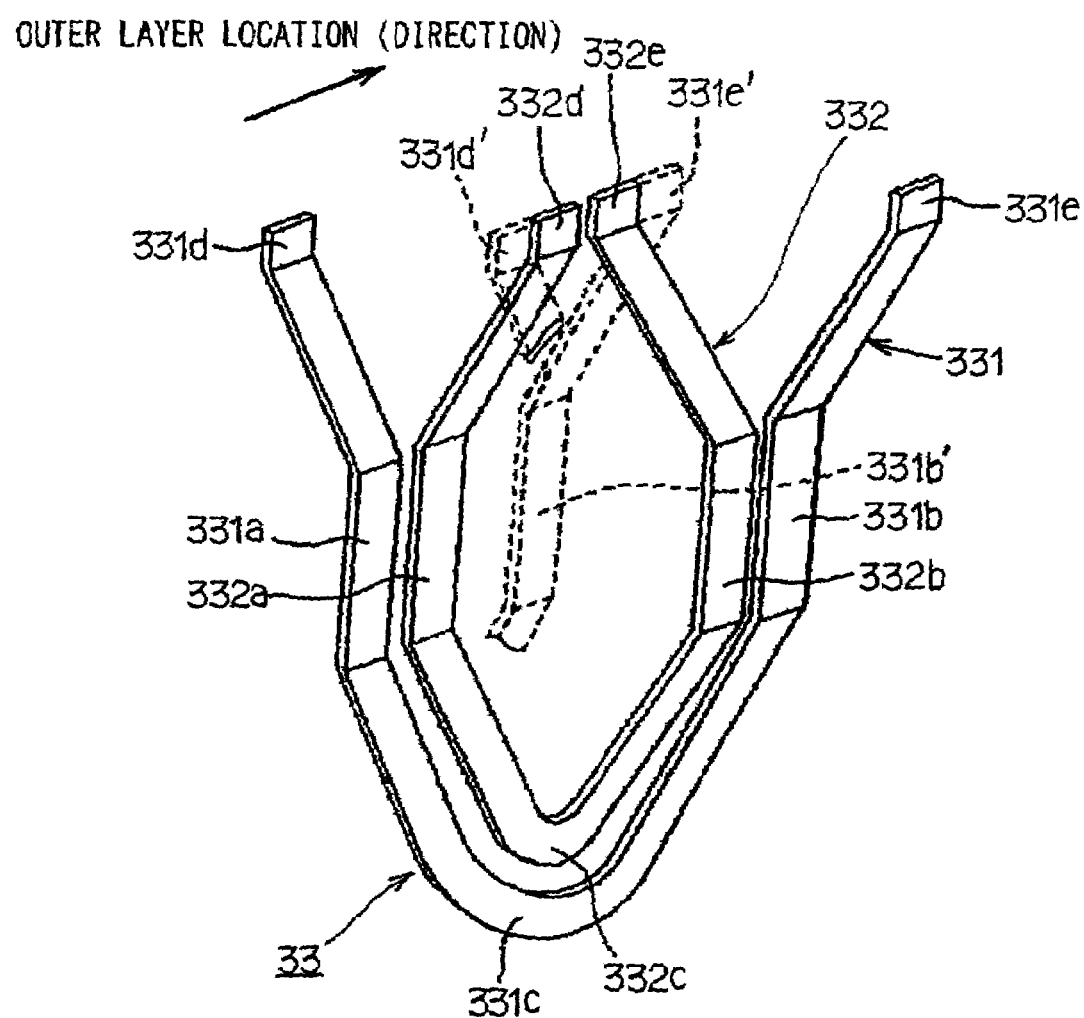
FIG. 3 is a schematic perspective view of a segment in the first embodiment.
Figure 4:
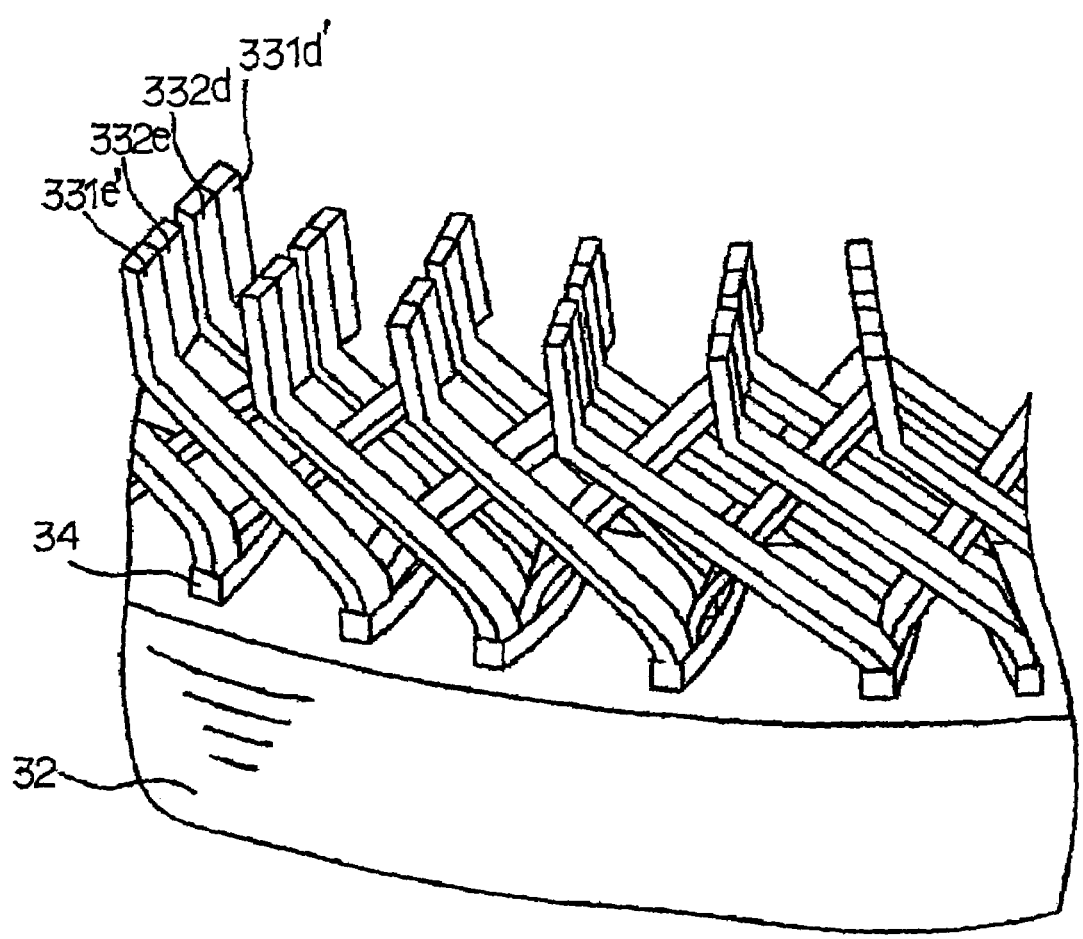
FIG. 4 is a perspective view of a second coil-end group side of the first embodiment.

FIG. 2 is a partial cross-sectional view of the stator 2, and FIG. 3 is a perspective view illustrating the schematic shape of a segment 33 mounted on the stator core 32. As shown in FIG. 2, the stator core 32 is formed with a plurality of slots 35 so as to accommodate a multi-phase stator winding. In this particular embodiment, seventy-two slots 35 are arranged at regular intervals to accommodate a three-phase stator winding, corresponding to the number of poles in the rotor 3.

The stator winding fitted in the slots 35 of the stator core 32 can be regarded as discrete electrical conductors, and in this regard each of the slots 35 contains an even number (four in this embodiment) of electrical conductors. These four electrical conductors accommodated in the single slot 35 are radially aligned from inside toward the outside of the stator core 32, forming an innermost layer, inner-middle layer, outer-middle layer, and outermost layer. These electrical conductors are coated with polyamideimide or the like to form an insulation film 37 on their surface.

The stator winding is formed by connecting these electrical conductors in a predetermined pattern. In this embodiment, the electrical conductors accommodated in the slots 35 in radial alignment are electrically insulated from each other, their ends extending to the outside of the slots 35. These extending ends, on the side of the first coil-end group 31a, are connected together by being continuous wires, while those on the side of the second coil-end group 31b are connected together by bonding. One of the electrical conductors in each slot 35 makes a pair with one of the electrical conductors in another slot 35 that is spaced therefrom at a distance corresponding to a predetermined pole pitch.

More specifically, an electrical conductor in a predetermined layer within one slot 35 makes a pair with an electrical conductor in a different layer within a different slot 35 which is at a distance corresponding to the predetermined pole pitch. This arrangement is for securing certain clearances between the plurality of electrical conductors at one coil end while aligning them in a desired pattern. For example, the electrical conductor 331a in the innermost layer of one slot makes a pair with the electrical conductor 331b in the outermost layer of another slot that is spaced by one pole pitch in the clockwise direction of the stator core 32. Similarly, the electrical conductor 332a in the inner-middle layer of one slot makes a pair with the electrical conductor 332b in the outer-middle layer of another slot that is spaced by one pole pitch in the clockwise direction of the stator core 32.

These pairs of electrical conductors are connected to each other via continuous turn portions 331c and 332c formed at one axial end of the stator core 32. Thus at this end of the stator core 32, the continuous wire that connects the electrical conductors of the innermost and outermost layers circumscribes the continuous wire that connects the electrical conductors of the inner-middle and outer-middle layers. In other words, at one end of the stator core 32, the connecting portion of a pair of electrical conductors is surrounded by the connecting portion of another pair of electrical conductors accommodated in the same slots. The connecting portions of the electrical conductors of the inner-middle and outer-middle layers form an inner layer of the coil end, and the connecting portions of the electrical conductors of the innermost and outermost layers form an outer layer of the coil end.

Meanwhile, the electrical conductor 332a in the inner-middle layer of one slot also makes a pair with a specific electrical conductor in the innermost layer of another slot that is spaced away in the clockwise direction of the stator core 32 by one pole pitch. Similarly, the electrical conductor 331b' in the outermost layer of one slot makes a pair with the electrical conductor 332b in the outer-middle layer of another slot that is spaced away in the clockwise direction of the stator core 32 by one pole pitch. These electrical conductors are connected together by bonding at the other (opposite) axial end of the stator core 32.

Therefore, at the other end of the stator core 32, the bonded portions connecting the electrical conductors of the outermost and outer-middle layers, and the bonded portions connecting the electrical conductors of innermost and inner-middle layers, are arranged side by side in the radial direction. These bonded portions of the electrical conductors of the outermost and outer-middle layers and those of the innermost and inner-middle layers form adjacent layers of the coil end.

Thus at the other end of the stator core 32, the connecting portions of the pairs of electrical conductors are arranged side by side without overlapping each other. Furthermore, these plurality of electrical conductors are made of segments of a predetermined shape having a flat rectangular cross section and a uniform width. As shown in FIG. 3, a U-shaped large segment 331 constitutes the electrical conductors of the innermost and outermost layers, and a U-shaped small segment 332 constitutes the electrical conductors of the inner-middle and outer-middle layers.

One large segment 331 and one small segment 332 make up a basic segment 33. The basic segment 33 may be referred to as a "conductor segment" or simply a "segment" in the following description. These basic segments 33 are fitted in the slots 35 in a regular pattern so as to form a two-turn winding around the stator core 32. The segments for constituting a leading wire of the stator winding and for connecting the first turn with the second turn of the winding have a different shape from the basic segments. This embodiment uses three such irregular-shape segments. The connection between the first turn and second turn of the winding, where the outer layer and the inner layer of the coil end are connected, forms an irregular-shape coil end.

Hereinafter, the manufacturing process of the stator winding will be described.

The manufacturing process of the stator 2 includes the steps of: a step of forming radial indentations in the side faces of each of the conductor segments 331 and 332 by pressing; a step of inserting the conductor segments 331 and 332 in the slots 35 so that they adjoin each other in the radial direction; a step of bending each of the conductor segments and the adjacent conductor segments (for example, 331a and 332a, and 332b' and 331b') in different circumferential directions (clockwise and counterclockwise) at a predetermined pole pitch angle such that the indentations formed in the side faces of the conductor segments (for example, 331a and 332a, and 332b' and 331b') intersect each other in a face-to-face relationship; and a step of bonding the ends of the conductor segments to the ends of their radially adjoining conductor segments (for example, 331d' and 332d, and 332e and 331e').

Figure 7A:
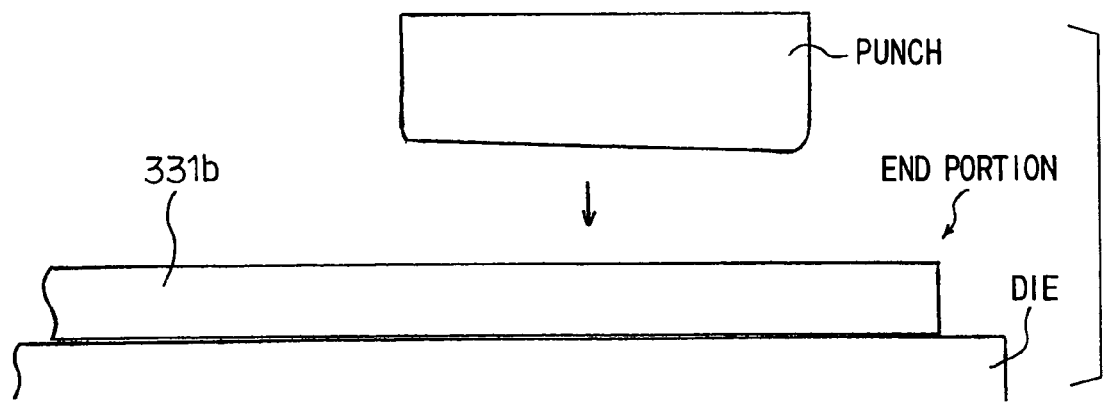
FIG. 7A is a diagram showing how to form an indentation by pressing.
Figure 7B:
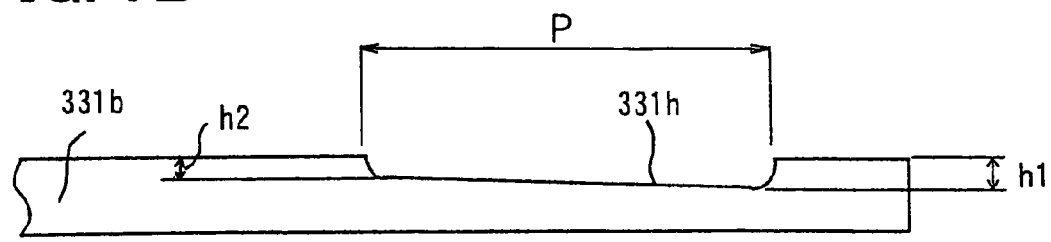
FIG. 7B is an enlarged view illustrating the indentation in the vicinity of the end of the segment of FIG. 6.

In the step of forming indentations, as shown in FIGS. 7A and 7B, a die is placed on one side (on the opposite side of a straight portion 332b) of a straight portion 331b of the conductor segment, and the other side of the straight portion 331b (the side facing the straight portion 332b) is pressed by a tapered punch. The punch is tapered in a lateral direction so that its protrusion in the pressing direction denoted by the arrow increases gradually towards the end of the straight portion 331b. Thus the formed indentation 331h has a gradually increasing depth towards one end.

In the insertion step, basic segments 33 are inserted from one axial side of the stator core 32, such that the turn portion 331c of the U-shaped large segment circumscribes the turn portion 332c of the U-shaped small segment 332. One electrical conductor 331a of the large segment 331 is inserted into the innermost layer of one of the slots in the stator core 32, while one electrical conductor 332a of the small segment 332 is inserted into the inner-middle layer of the same slot. The other electrical conductor 331b of the large segment 331 is inserted into the outermost layer of a different slot that is distanced by one pole pitch from the aforementioned slot in the clockwise direction of the stator core 32, while the other electrical conductor of the small segment 332 is inserted into the outer-middle layer of this second slot.

As a result, as shown in FIG. 2, the straight portions 331a, 332a, 332b', and 331b' of these electrical conductors are aligned in one slot from the innermost layer side toward the outside. The straight portions 332b' and 331b' are of the large and small segments that respectively make pairs with electrical conductors in the different (or the second) slot that is spaced by one pole pitch. Since the electrical conductor 33 is made of a U-shaped segment, it shows a certain springback in a direction in which the turn portions 331c, 332c spread. Accordingly, there is a certain clearance between the straight portions 332a and 332b of the small segment 332.

In the bending step, after the large and small segments 331 and 332 have been inserted, the straight portions 331a and 331b positioned at the outer layer of the coil end are bent in a direction in which the large segment 331 opens out, so that their bonded ends 331d and 331e will be positioned away from each other by a pitch of half a pole (which corresponds to one and a half slots in this embodiment). The straight portions 332a and 332b positioned at the inner layer of the coil end are bent in a direction in which the small segment 332 closes, so that their bonded ends 332d and 332e will be positioned closer by a pitch of half a pole. Thus the second coil-end group 31b is laid out such that radially adjacent electrical conductors are bent in circumferentially opposite directions, and radially intersect each other at one point or more.

The other segments 33 are all fitted likewise in each of the slots 35.

In the bonding step, the bonded ends 331e' and 332e of the outermost and outer-middle layers, and the bonded ends 332d and 331d' of the inner-middle and innermost layers, are respectively bonded together by any of welding, ultrasonic welding, arc welding, or soldering so as to achieve an electrical connection. The resultant stator appears as shown in the perspective view of FIG. 4.

Figure 5:
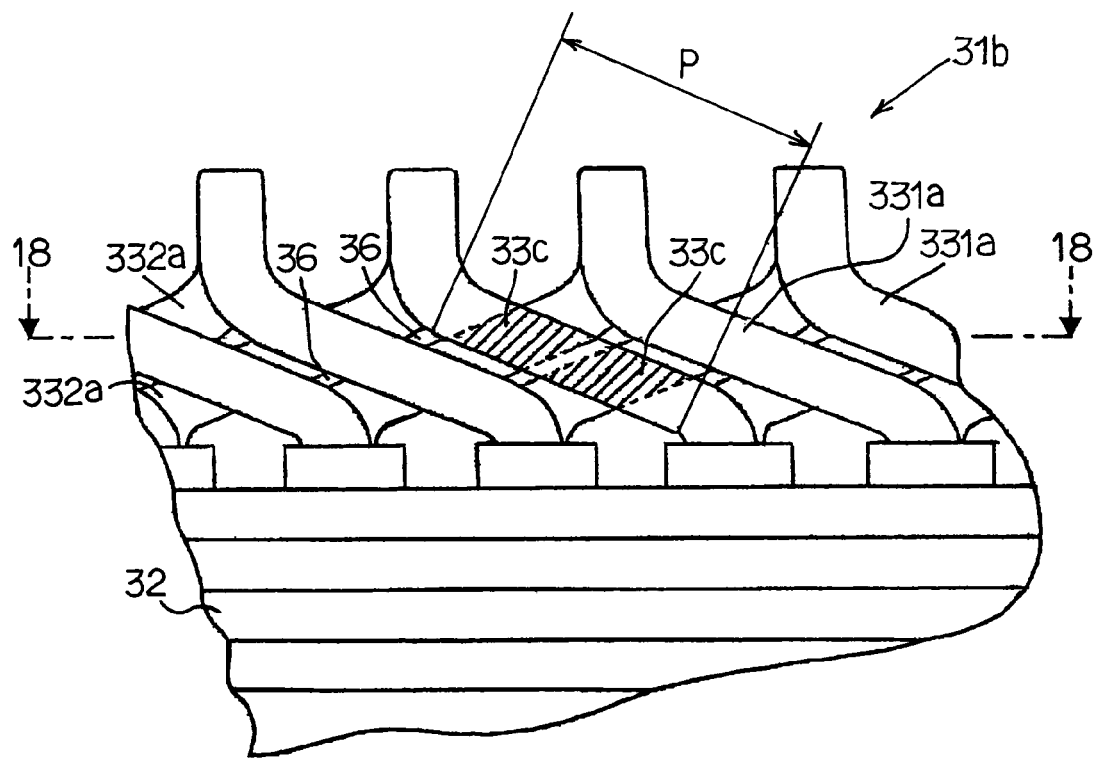
FIG. 5 is a side view of the second coil-end group of the first embodiment viewed from the inside of the stator.
Figure 6:
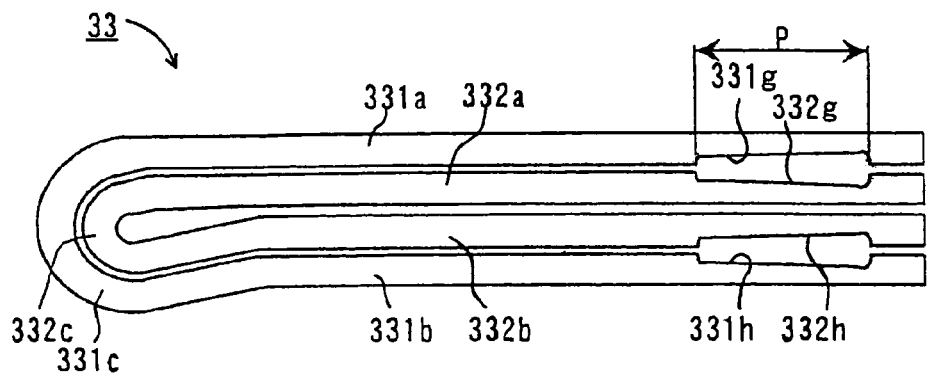
FIG. 6 is a plan view of a segment used in the first embodiment.
Figure 8:
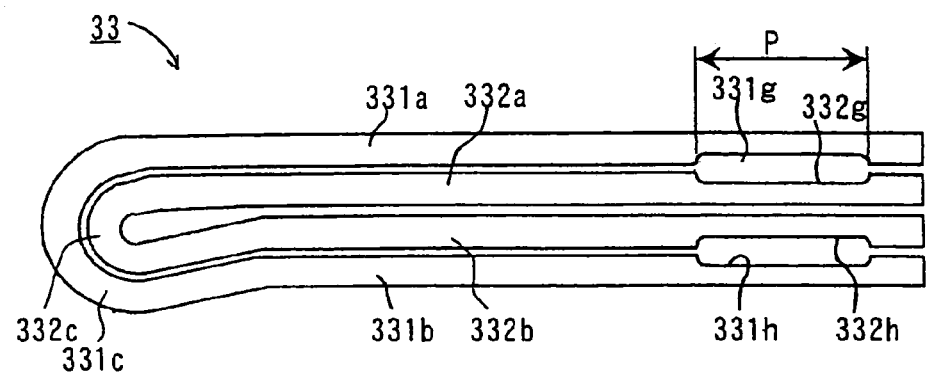
FIG. 8 is a plan view of a segment in the prior art.
Figure 9:
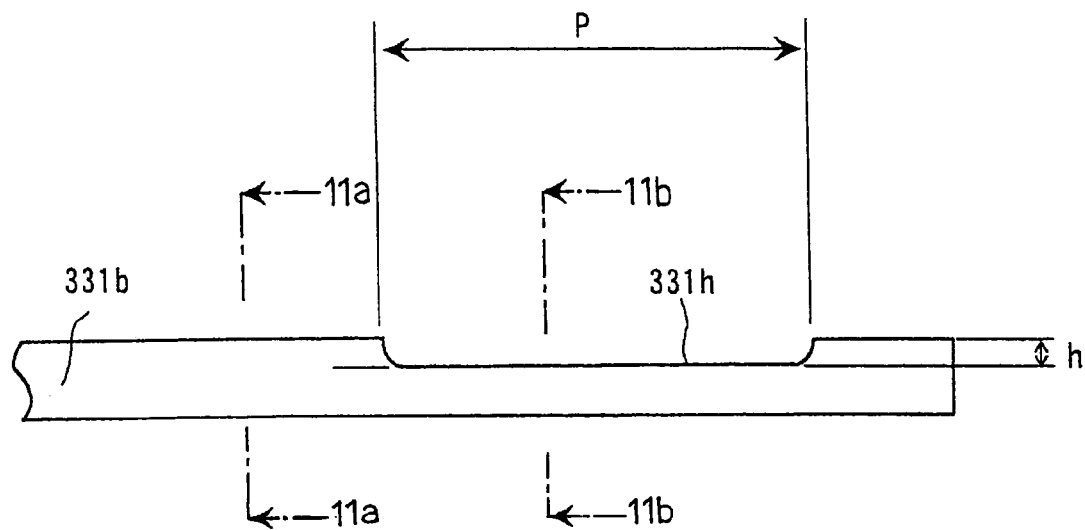
FIG. 9 is an enlarged view illustrating the indentation in the vicinity of the end of the segment of FIG. 8.

FIG. 5 is a side view of the second coil-end group 31b viewed from the inside of the stator core 32. FIG. 6 is a diagram illustrating a large segment and a small segment, and FIG. 7B is an enlarged view of the indentations in FIG. 6. FIG. 8 is a diagram illustrating a large segment and a small segment according to prior art, and FIG. 9 is an enlarged view of the indentation 331h in FIG. 8. As shown in FIGS. 6 and 8, the large and small segments 331 and 332 are formed with indentations 331g, 331h, 332g, and 332h in their respective straight portions 331a, 331b, 332a, and 332b in the faces opposing each other when the turn portions 331c and 332c are aligned with each other in multiple layers. These indentations 331g, 331h, 332g, and 332h are provided over an area P that covers intersecting portions 33c where the radially adjacent electrical conductors intersect each other when the segments 33 are bent in the circumferential direction after being inserted into the slots 35.

These indentations 331g, 331h, 332g, and 332h are formed in the opposite side faces of radially adjacent conductor segments over the area P shown in FIGS. 5 and 6. In other words, the conductor segments have a smaller thickness in the area where these indentations 331g, 331h, 332g, and 332h are formed than the radial thickness at either end of the segments 331 and 332. Thus a sufficient clearance is secured between each adjacent conductor segment in the area P, which in turn enhances insulation between the conductor segments in the area P at the coil end where they intersect each other. This improves the cooling efficiency when air passes.

In the prior art conductor segments shown in FIG. 8, the indentations 331g, 331h, 332g, and 332h of the large and small segments 331 and 332 are formed parallel to the length of their straight portions 331a, 331b, 332a, and 332b, so that the conductor segments have a uniform thickness in their indentations 331g, 331h, 332g, and 332h. In contrast, the indentations 331g, 331h, 332g, and 332h in this embodiment are formed such that the thickness of the segments reduces towards the coil end (where the ends of the segments are bonded together).

Referring to FIG. 7B, for example, an indentation 331h formed in a segment's straight portion 331b in this embodiment is typically formed such that its depth h1 near the coil end or the end of the conductor segment is larger than the depth h2 that is away from the coil end, or h1>h2. In other words, the indentations 331g, 331h, 332g, and 332h are formed to have a gradually increasing depth toward the ends where the adjacent conductor segments are bonded together, so that each of the indentations of the segments has a taper shape (the thickness of the segment is reduced towards the ends).

The principal benefits of providing such a taper in the indentations will be described below.

Figure 10:
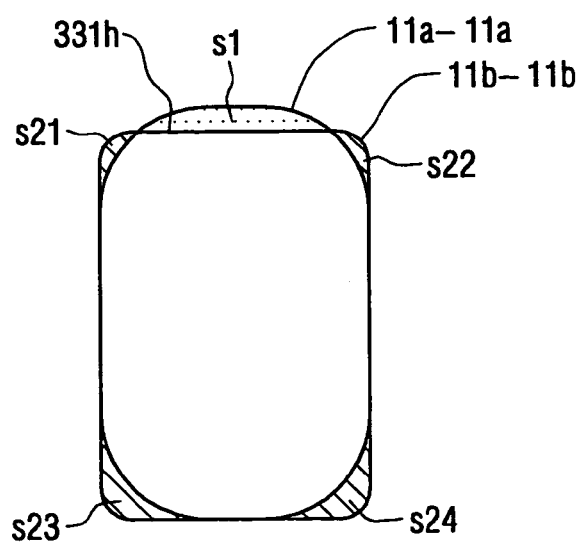
FIG. 10 is a cross-sectional view taken along the line 11a—11a of FIG. 9 in superposed relation with a cross section taken along the line 11b—11b of FIG. 9.

FIG. 10 is a cross section taken along the line 11a—11a of FIG. 9 in superposed relation with a cross section taken along the line 11b—11b of FIG. 9. The 11a—11a cross section shows a cross-sectional configuration of the straight portion of the conductor segment, and the 11b—11b cross section shows a cross-sectional configuration of the indentation 331h of the conductor segment. The same is true for 331g, 332g, and 332h. The conductor segment before being formed with the indentation 331h has a rectangular cross section with rounded corners, or a cross section that can be regarded as oval, as shown in FIG. 10. The rounded corners have a radius to an extent that will absorb any displacement of the material when the indentation 331h is formed by pressing. Therefore the width of the conductor segment remains the same as that shown in FIG. 10 even in the indentations 331g, 331h, 332g, and 332h. In other words, the relationship between the cross-sectional areas s1 to s24 indicated by diagonal lines in FIG. 10 can be expressed as follows:

$$s1 = s21 + s22 + s23 + s24 \quad \text{(Equation 1)}$$

Figure 11A:
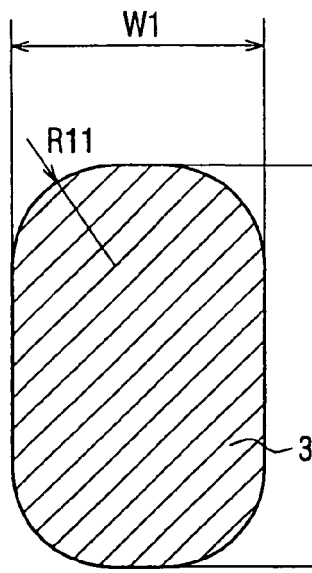
FIG. 11A is a cross-sectional view of a segment before being formed with an indentation.
Figure 11B:
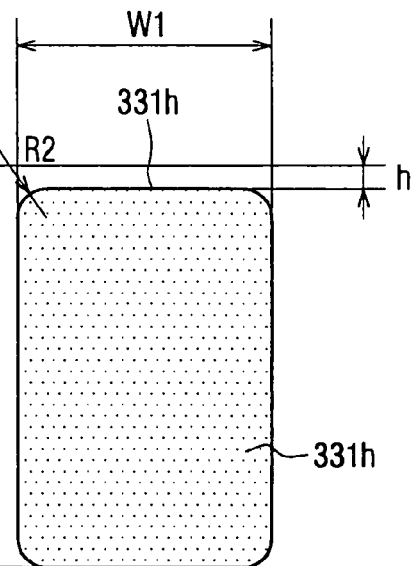
FIG. 11B is a cross-sectional view of the segment of FIG. 11A after an indentation has been formed.

FIGS. 11A and 11B show cross sections of the conductor segment before and after forming the indentations. FIG. 11A is a cross section before forming the indentations (a cross section taken along the line 11a—11a of FIG. 9, and FIG. 11B is a cross section after forming the indentations (a cross section taken along the line 11b—11b of FIG. 9. W1 represents the width of the conductor segment, R11 the radius of the rounded corners in the rectangular cross section of the conductor segment before forming the indentation 331h, and R2 the radius of the rounded corners in the rectangular cross section of the conductor segment after forming the indentation 331h. As can be seen from FIGS. 11A and 11B, the width W1 of the conductor segment remains unchanged before and after forming the indentation. That is, the displacement of the material which occurs when pressing an indentation of a depth h is absorbed by the rounded corners becoming sharper, i.e., by the reduction in radius from R11 to R2 at the rounded corners of the rectangular cross section of the conductor segment.

Figure 12A:
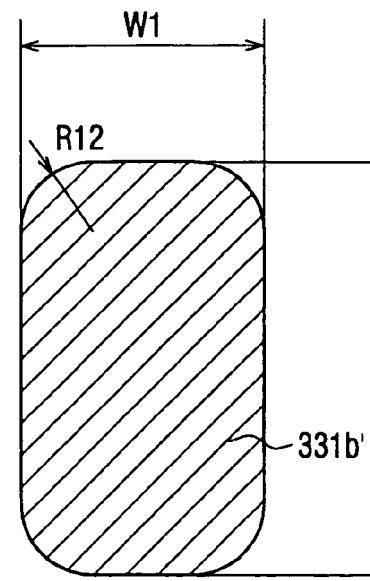
FIG. 12A is a cross-sectional view of a segment with a smaller corner radius that FIG. 11A before being formed with an indentation.
Figure 12B:
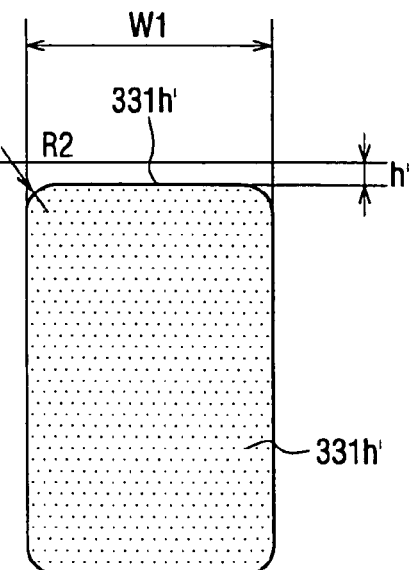
FIG. 12B is a cross-sectional view of the segment of FIG. 12A after an indentation has been formed.

FIGS. 12A and 12B illustrate a change in the cross-sectional configuration of the conductor segment when forming an indentation in a case in which the conductor segment has a smaller radius R12 than R11 in FIG. 11A at the corners of its rectangular cross section. If the indentation is to be formed to allow the equation 1 to be established, the depth h' of the indentation will be smaller than the depth h. Therefore, a sufficient clearance will not be secured at the intersecting portions of the conductor segments, and there is the risk of short-circuiting the segments. On the other hand, if the indentation is forcibly formed so that h'=h, the conductor segments could suffer a crack in their insulation film, in which case there is also a high risk of short-circuiting the segments.

Figure 13A:
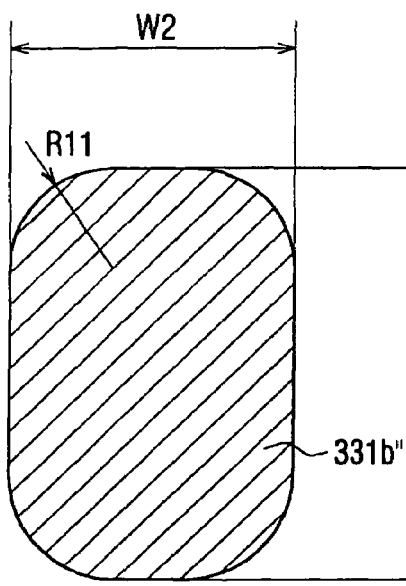
FIG. 13A is a cross-sectional view of a segment with a larger width than the segment of FIG. 12A before being formed with an indentation.
Figure 13B:
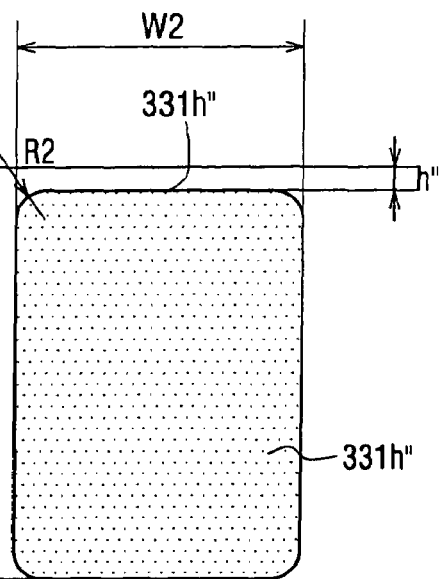
FIG. 13B is a cross-sectional view of the segment of FIG. 13A after an indentation has been formed.

Next, FIGS. 13A and 13B illustrate a change in the cross-sectional configuration of the conductor segment when forming an indentation in a case in which the conductor segment has a larger width W2 than W1 in FIG. 11A. If the indentation is to be formed while allowing the equation 1 to be established, the depth h" of the indentation will be smaller than the depth h'. Therefore, a sufficient clearance will not be secured at the intersecting portions of the conductor segments, and there is the risk of short-circuiting. On the other hand, if the indentation is forcibly formed so that h"=h, the conductor segments could suffer a crack in their insulation films, in which case there is also a high risk of short-circuiting.

As demonstrated above, if the radius at the rounded corners in the rectangular cross section of the conductor segment is too small, or if the width of the conductor segment is too large, the indentations cannot be formed with a satisfactory depth for providing sufficient clearances at the intersecting portions of the conductor segments. The intersecting portions 33c shown in FIG. 5, particularly near the bonded ends at the coil end, are susceptible to damage in the insulation films such as peeling or cracks because of the heat of welding. Accordingly, it is important to secure sufficient clearances between the conductor segments near the bonded ends.

In this embodiment, the large and small segments 331 and 332 are formed with the indentations 331g, 331h, 332g, and 332h having a reverse taper with their depths increasing towards the segment ends on the opposite side of the turn portions 331c and 332c near the segment ends, which will be bonded together, and therefore they are provided with sufficient clearances near their bonded ends. Further, even if it is difficult to form the indentations with a sufficient depth because of a small corner radius of the rectangular cross section of the conductor segments, or because of a large width of the conductor segments, it is possible to secure satisfactory clearances at intersecting portions of the conductor segments near their bonded ends at the coil end where short-circuiting is most likely to occur.

Accordingly, vibration of the vehicle will not easily cause radially adjacent electrical conductors at the second coil-end group 31b to contact each other, and thereby the risk of the insulation film 37 being damaged will be reduced. Also, short-circuiting caused by contacts between damaged portions of insulation films 37 is prevented.

Further, there are clearances in the radial direction in the intersecting portions 33c between adjacent conductor segments. Because of these, a centrifugal air current having a circumferential component created by inner fans can pass not only through the mesh-like air passages 36 in the second coil-end group 31b but also through the radial clearances in the intersecting portions 33c between the conductor segments. Thus the coil end is cooled much more efficiently.

In the embodiment described above, the indentations 331g, 331h, 332g, and 332h are provided over the area P that covers the whole intersecting portions 33c of the radially adjacent conductor segments. However, they need not necessarily span the entire intersecting portions, and may instead, for example, as shown in FIG. 14, cover only the intersecting portions Q near the bonded ends where short-circuiting is most likely to occur.

Figure 14:
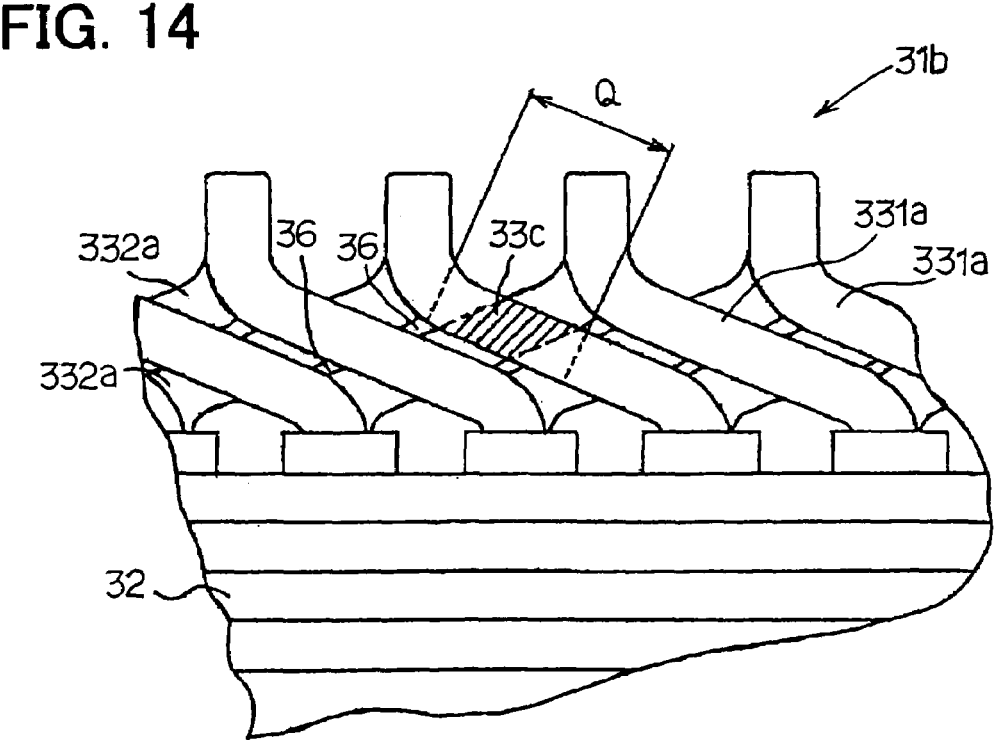
FIG. 14 is a side view of the second coil-end group of the first embodiment viewed from the inside of the stator.

FIGS. 5 and 14 both show examples in which the conductor segments intersect each other at two points, but if there are more than three intersecting points, the indentations may be provided such as to cover all those three or more intersecting points.

The indentations 331g, 331h, 332g, and 332h need not necessarily be flat-shaped and may be curved.

(Second Embodiment)

In a second embodiment of the present invention, even when the adjoining conductor segments at the coil end cross each other in a twisted state, clearances are secured in the intersecting portions of adjacent conductor segments by forming radial indentations.

The manufacturing process of the stator 2 of the second embodiment includes: a step of forming indentations in the side faces of each of the conductor segments 331 and 332 by pressing, the indentations being slanted so as to be oriented in the radial direction when the segments are twisted; a step of inserting the conductor segments 331 and 332 in the slots 35 so that they adjoin each other in the radial direction; a step of bending each of the conductor segments and radially adjacent segments (for example, 331a and 332a, and 332b' and 331b') in different circumferential directions at a predetermined pole pitch angle in a twisting fashion such that the indentations formed in the side faces of the adjacent conductor segments (for example, 331a and 332a, and 332b' and 331b') intersect each other in a face-to-face relationship; and a step of bonding the ends of the conductor segments to the ends of the radially adjoining conductor segments (for example, 331d' and 332d, and 332e and 331e').

In the bending step after the large and small segments 331 and 332 have been inserted into the stator core 32, as shown in FIG. 3, the straight portions 331a and 331b positioned at the outer layer of the coil end are bent in a direction in which the large segment opens out, so that their bonded ends 331d and 331e will be positioned away from each other by a pitch of half a pole (which corresponds to one and a half slots in this embodiment).

The straight portions 332a and 332b positioned at the inner layer of the coil end are bent in a direction in which the small segment 332 closes, so that their bonded ends 332d and 332e are closer to each other by a pitch of half a pole. Thus the second coil-end group 31b is laid out such that radially adjacent electrical conductors are bent in circumferentially opposite directions. The large and small segments 331 and 332 may be twisted when being bent as described above. How such a twist would occur in the prior art large and small segments 331 and 332 will be explained below with reference to FIGS. 15 and 16.

Figure 15:
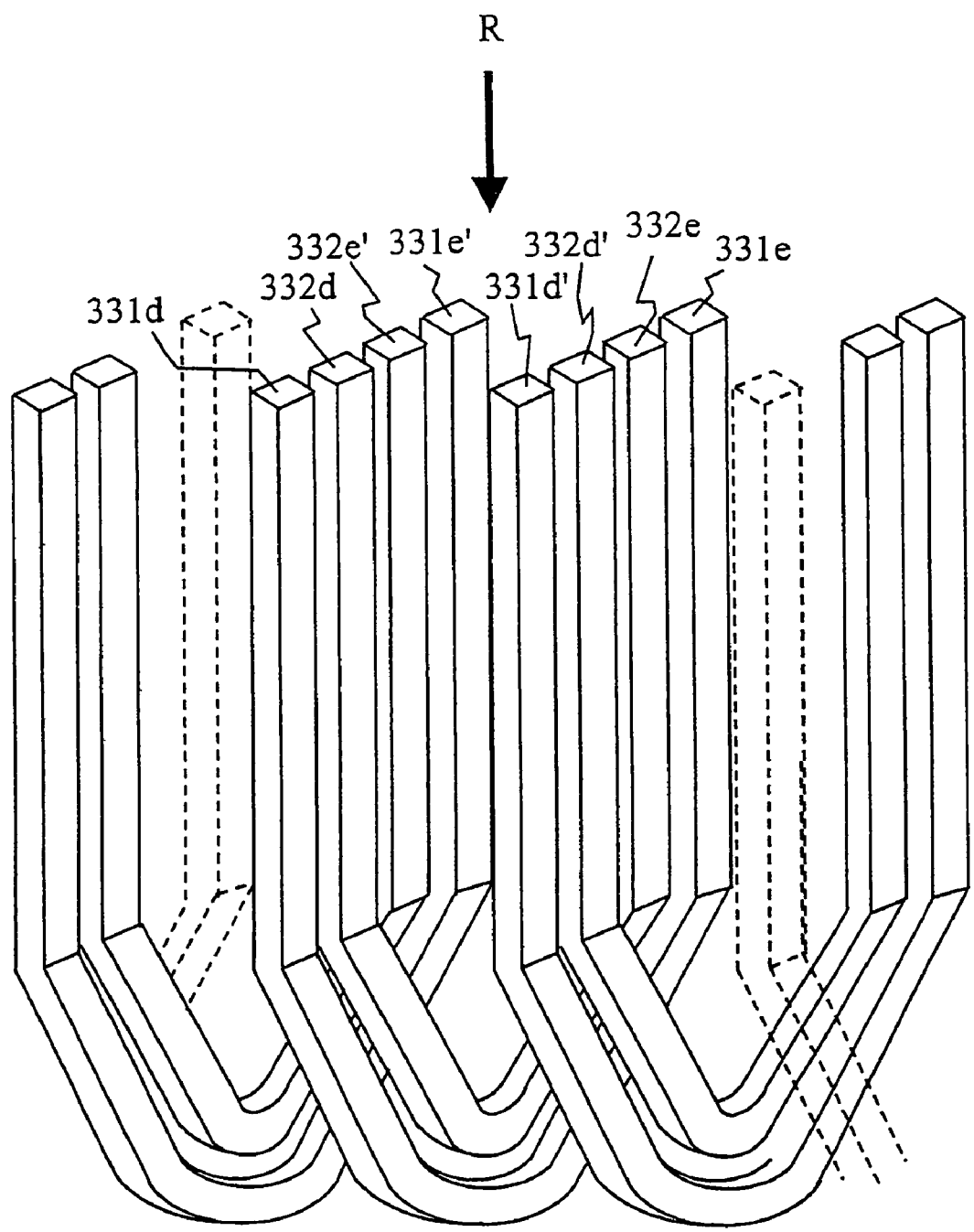
FIG. 15 is a schematic perspective view of large and small segments inserted in the slots of the stator.
Figure 16:
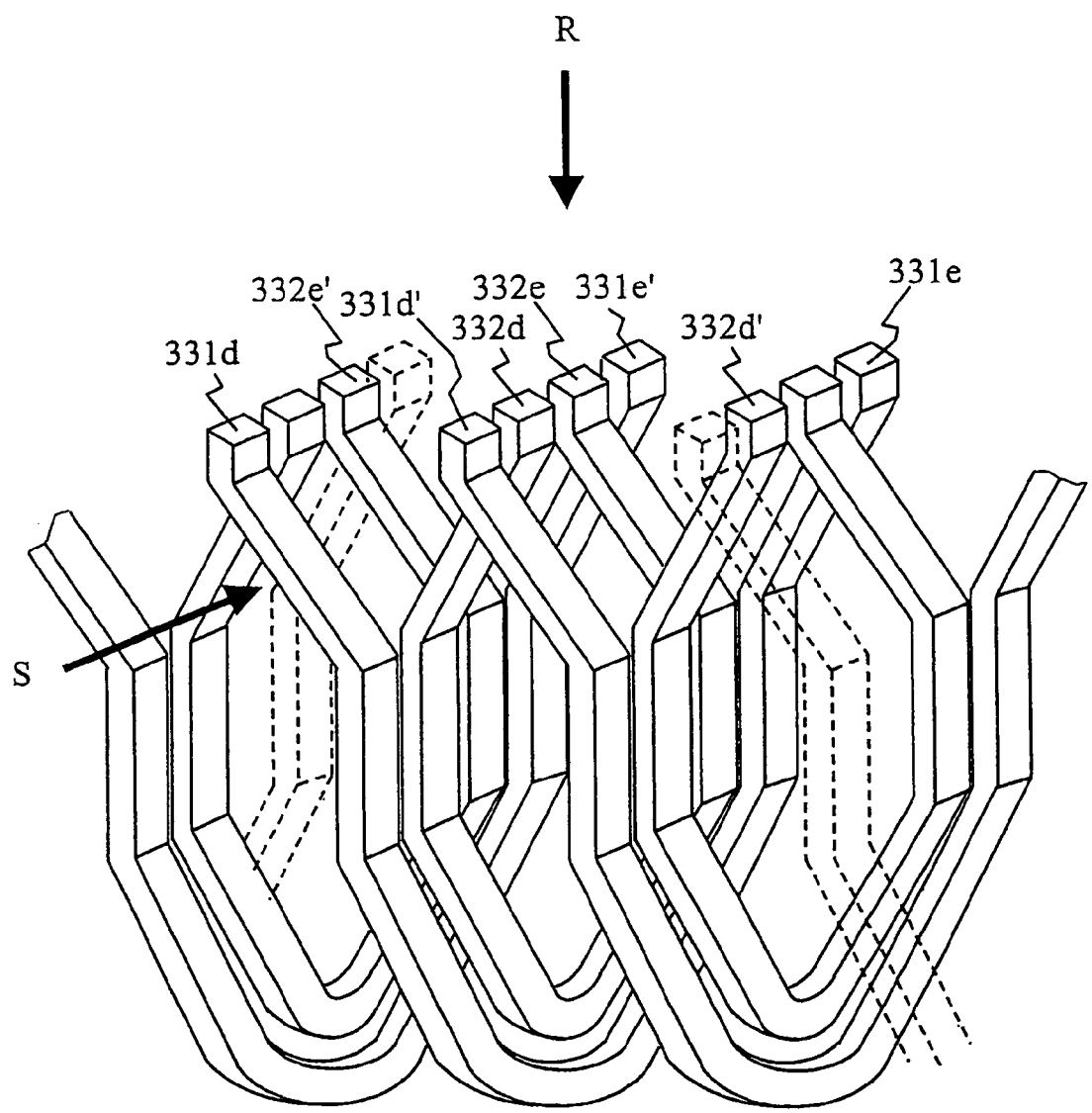
FIG. 16 is a schematic perspective view of large and small segments inserted in the slots of the stator, each of them being bent in respective circumferential directions.
Figure 17:
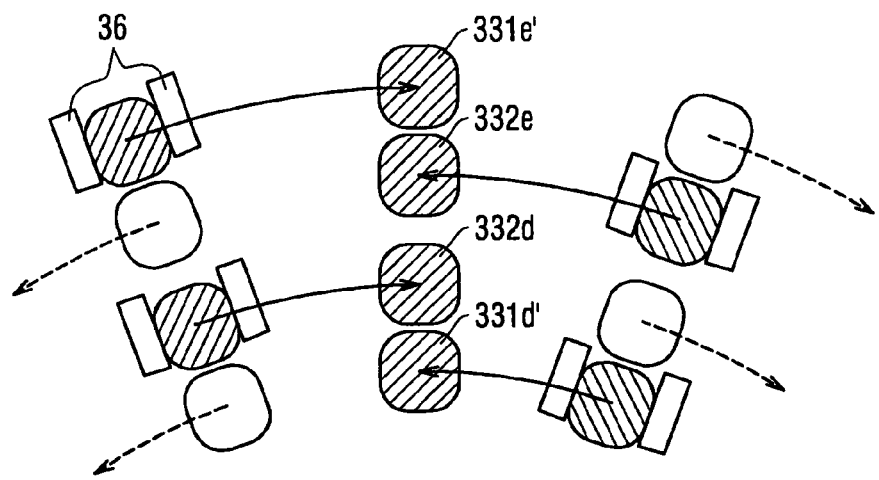
FIG. 17 is a schematic view of the segments viewed from their ends for illustrating their bending directions.

FIG. 15 illustrates large and small segments 331 and 332 of FIG. 3 that are inserted in the stator core. As described above, after being inserted into the stator core, the large and small segments 331 and 332 are bent in circumferential directions as shown in FIG. 16. At this time, the large and small segments 331 and 332 are bent in circumferentially opposite directions. Taking one row of bonded ends 331d', 332d, 332e, and 331e' as one example, how the large and small segments 331 and 332 are twisted will be explained with reference to FIGS. 15 and 16, and FIG. 17, which is a view taken in the direction of arrow R in FIG. 16.

Figure 18:
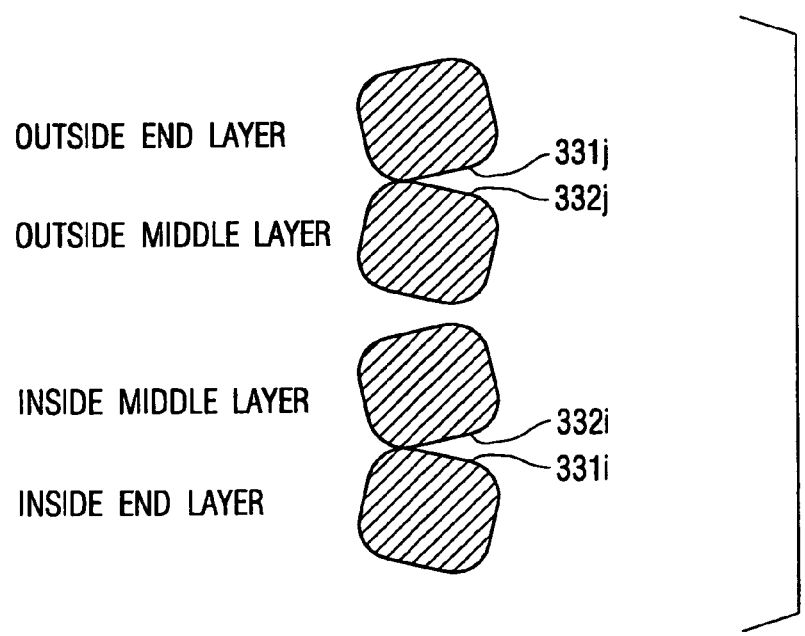
FIG. 18 is a cross-sectional view of intersecting portions of prior art segments which have no indentations and are twisted.

The ends 331d', 332d, 332e, and 331e' at the coil end of large and small segments 331 and 332 are clamped by twisting jigs 36 and moved along a circular track so that the segments are bent in circumferential direction by a pitch of half a pole. The ends of the segments are not twisted and arranged parallel to each other in single file towards the center of the stator. On the other hand, the other parts of the segments which are not clamped by the twisting jigs 36 become twisted as the segments are bent by a pitch of half a pole, since they are free from the grip of the jigs. Thus they are skewed relative to the center of the stator. FIG. 18 is a cross section across the line 18—18 of FIG. 5 viewed in the direction of arrow S in FIG. 16. The figure shows how the intersecting portions P of the conductor segments are twisted.

Figure 19:
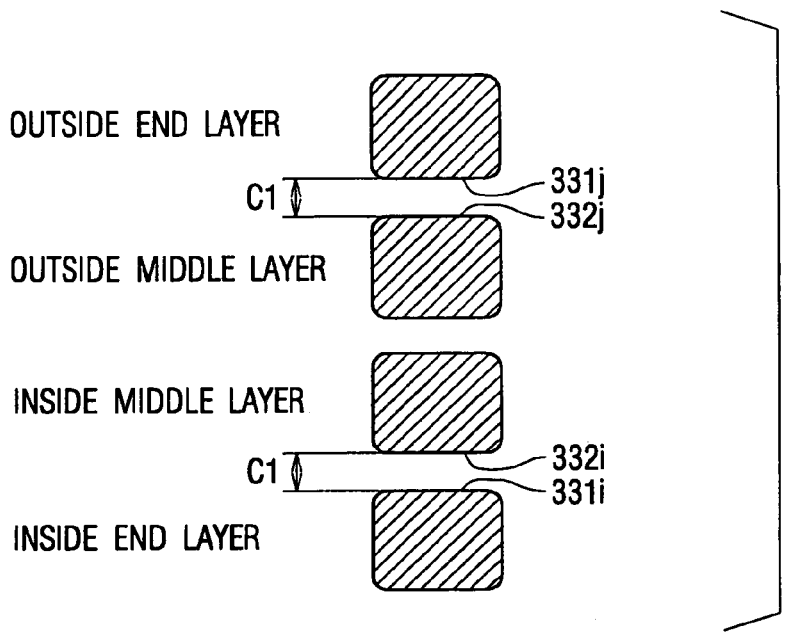
FIG. 19 is a cross-sectional view of intersecting portions of prior art segments which have indentations and are not twisted.
Figure 20:
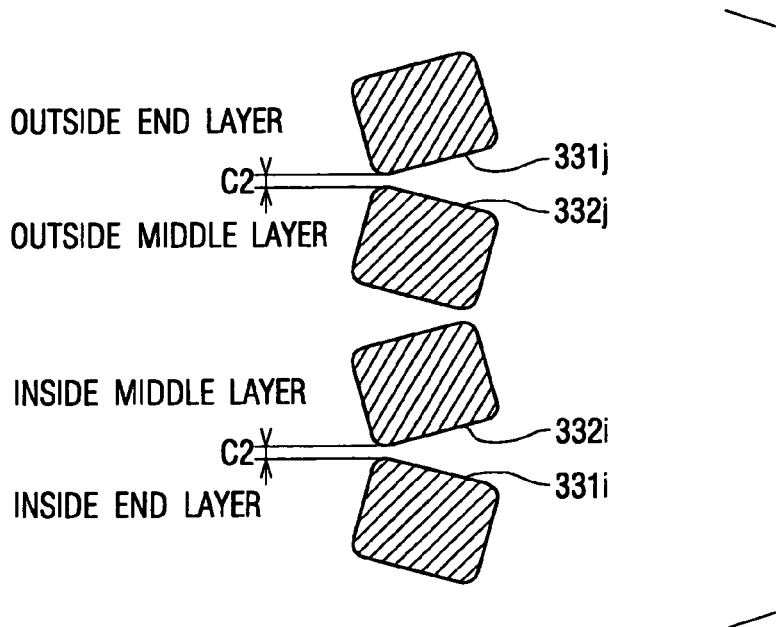
FIG. 20 is a cross-sectional view of intersecting portions of prior art segments which have indentations and are twisted.

As can be seen from FIG. 18, the innermost and outer-middle layers are twisted in one direction, while the inner-middle and outermost layers are twisted in the opposite direction, as a result of which the rounded corners of rectangular cross sections of the conductor segments are abutting the opposing segments. FIGS. 19 and 20 are cross sections, taken similarly to FIG. 18, of bond areas 331$i$, 332$i$, 331$j$, and 332$j$ of prior art segments provided with indentations 331$g$, 331$h$, 332$g$, and 332$h$ in the intersecting portions on the same plane as the bond areas of the segments. FIG. 19 illustrates the segments which are not twisted, and FIG. 20 illustrates those which are twisted. The clearance C2 between the segments in the intersecting portions when they are twisted is clearly smaller than the clearance C1 between the segments when they are not twisted. That is, when the segments are twisted, sufficient clearances cannot be secured in the intersecting portions of the segments, if the indentations are formed on the same plane as the bond areas. Because of this, the insulation films are more susceptible to damage, and short-circuiting is more likely to occur.

Figure 21:
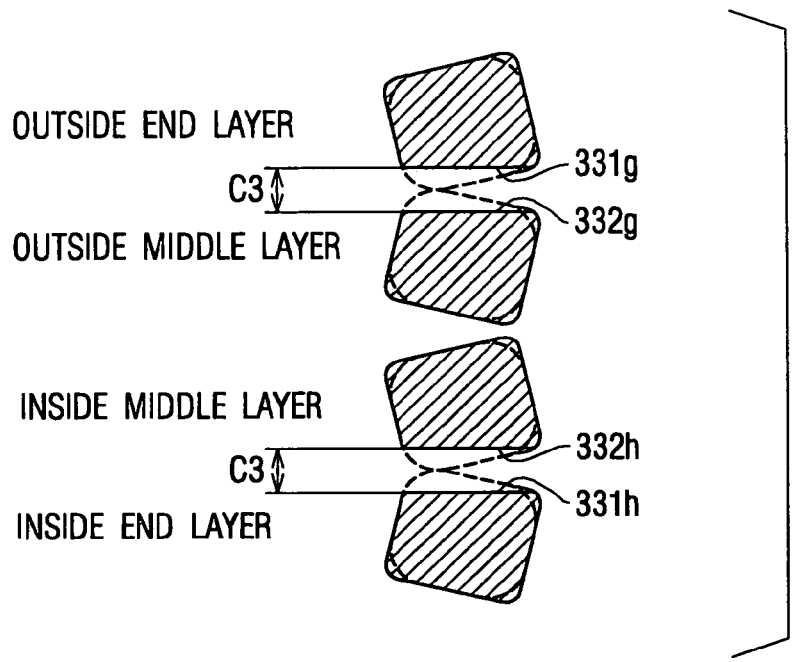
FIG. 21 is a cross-sectional view of intersecting portions of segments of a second embodiment of the present invention which have indentations and are twisted.

In the second embodiment, therefore, taking account of the twist in the intersecting portions of the conductor segments, the indentations 331$g$, 331$h$, 332$g$, and 332$h$ are provided as slanted side faces, as shown in FIG. 21, relative to the opposing bond areas of radially adjacent conductor segments. Thus the indentations 331$g$, 331$h$, 332$g$, and 332$h$ are oriented radially when the conductor segments are twisted, with opposing indentations 331$g$ and 332$g$, and indentations 331$h$ and 332$h$ being substantially parallel to each other. As a result, the clearance C3 in the intersecting portions 33$c$ is much larger than the clearance C2 shown in FIG. 20. The broken lines in the figure indicate the cross sections of the segments before forming the indentations by pressing.

Figure 22:
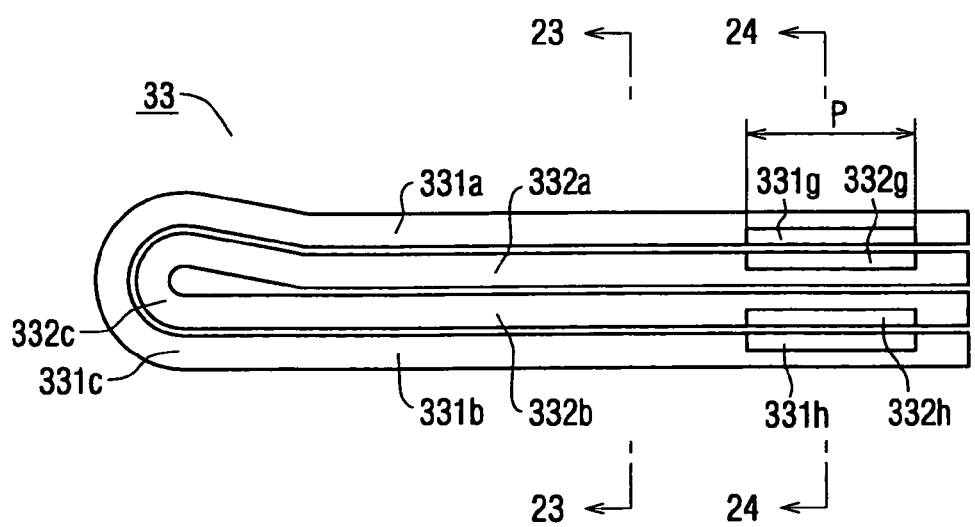
FIG. 22 is a plan view of a segment used in the second embodiment of the present invention.
Figure 23:
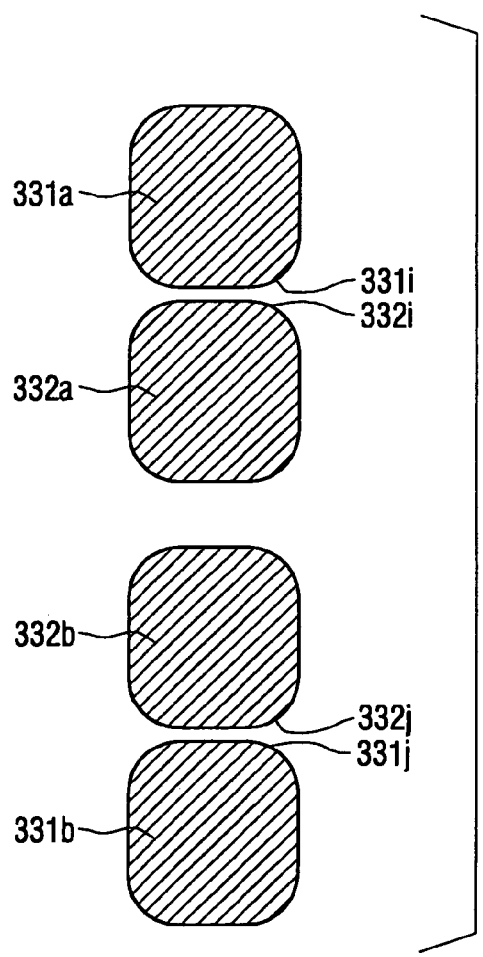
FIG. 23 is a cross-sectional view of the segment taken along line 23—23 of FIG. 22.
Figure 24:
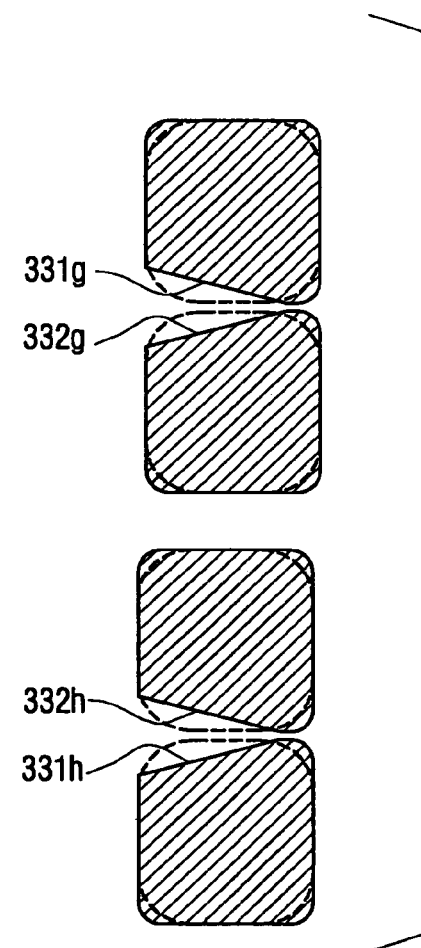
FIG. 24 is a cross-sectional view of the segment taken along line 24—24 of FIG. 22.

FIGS. 22 through 24 illustrate the large and small segments 331 and 332 of the second embodiment before being twisted. FIG. 22 is a perspective view, FIG. 23 is a cross-sectional view taken along the line 23—23 of FIG. 22, and FIG. 24 is a cross-sectional view taken along the line 24—24 of FIG. 22. The broken lines in FIG. 24 indicate the cross sections of the segments before forming the indentations by pressing.

Indentations 331$g$, 331$h$, 332$g$, and 332$h$ are provided over area P (see FIGS. 5 and 22) to cover intersecting portions 33$c$ where radially adjacent conductor segments 33, after being inserted into the slots 35, intersect each other when they are twisted in the circumferential direction. Accordingly, similarly to the first embodiment, sufficient clearances are secured in the intersecting portions of the conductor segments at the coil end, whereby damage to their insulation films and resulting short circuits are prevented.

Figure 25:
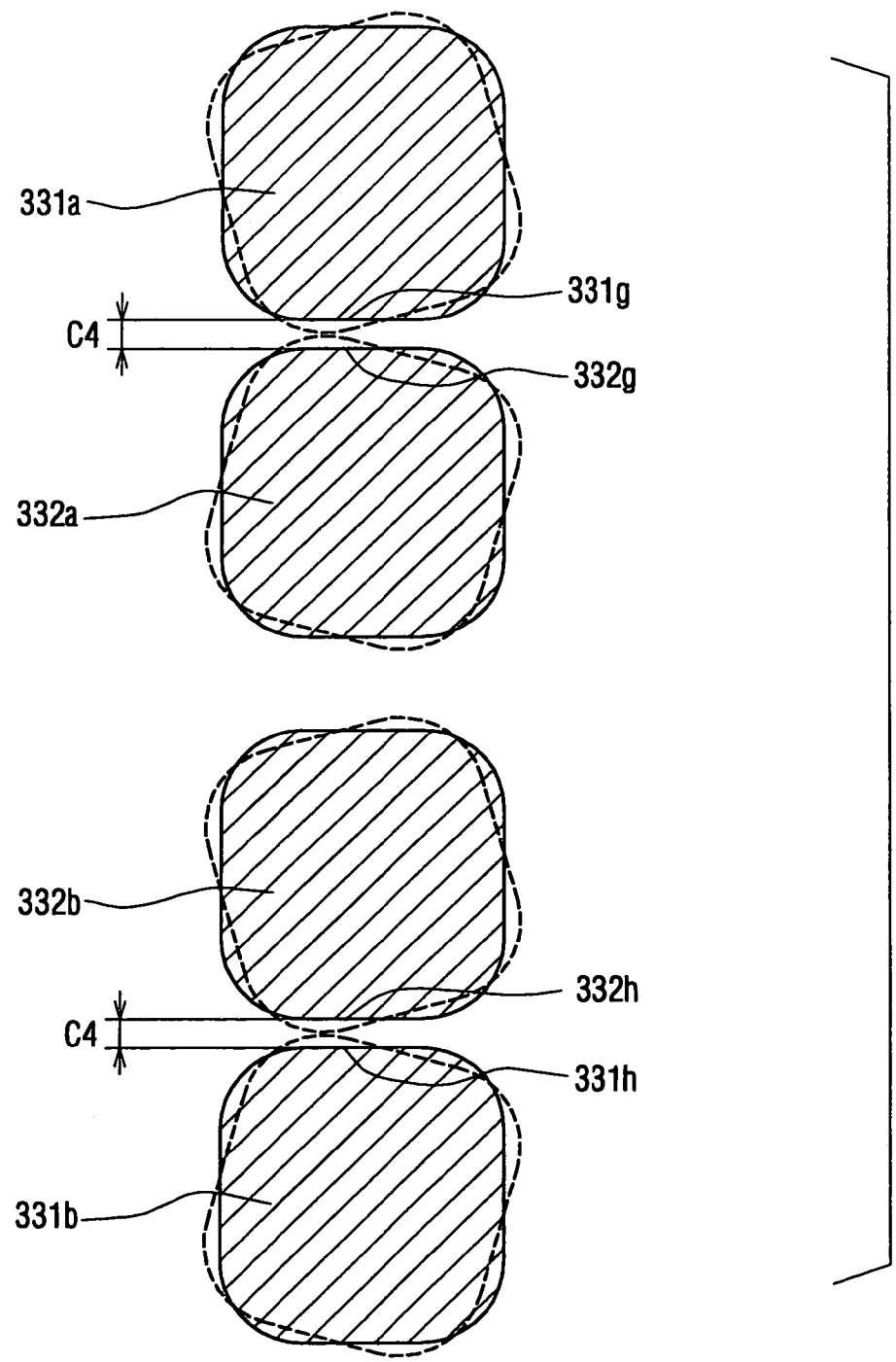
FIG. 25 is a cross-sectional view, corresponding to FIG. 24, of a modified example of the second embodiment of the present invention.

In the second embodiment described above, the twist in the conductor segments is taken into consideration, and so the indentations are formed to be slanted so that they will be oriented radially when the segments are twisted after being inserted into the slots 35. Another option is to provide the indentations on a plane parallel to the bond areas in the indentation formation step as in the first embodiment, and, after the segments have been twisted in the bending step, to twist back the segments in an additional step so that the indentations 331$g$ and 332$g$, and 331$h$ and 332$h$ will face each other in a substantially parallel relationship. FIG. 25 is a cross-sectional view of the indentations 331$g$, 331$h$, 332$g$, and 332$h$ in a modified example of the second embodiment, corresponding to FIG. 24 of the second embodiment. Broken lines in FIG. 25 indicate the segments before being twisted back in the additional step. In this modified example of the second embodiment, the clearance C4 in the intersecting portions is made larger than the clearance C2 in FIG. 20, and thus the same effects as those of the second embodiment can be expected.

Similar to the first embodiment, the indentations 331$g$, 331$h$, 332$g$, and 332$h$ need not necessarily span all intersecting portions but may cover only part of the intersecting portions near the ends which will be welded to other conductor segments where short-circuiting is more likely to occur. Alternatively, if the segments intersect each other at three or more intersecting points, the indentations may be formed at the three or more intersecting points.

The indentations 331$g$, 331$h$, 332$g$, and 332$h$ need not necessarily be flat-shaped, but may be curved.

(Third Embodiment)

The distinguishing feature of the third embodiment is that protrusions are formed at the ends (including the bond areas) of the conductor segments at the coil end. The protrusions are offset toward the other conductor segments to be bonded.

Figure 26:
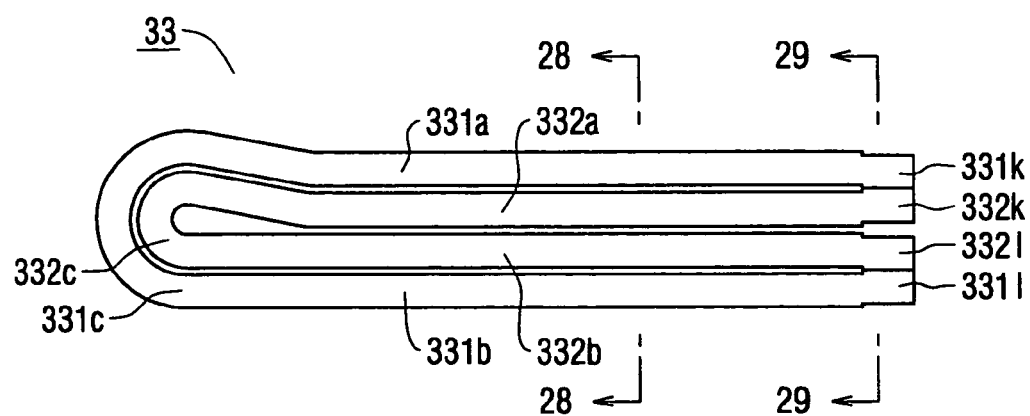
FIG. 26 is a plan view of a segment used in a third embodiment of the present invention.
Figure 27:
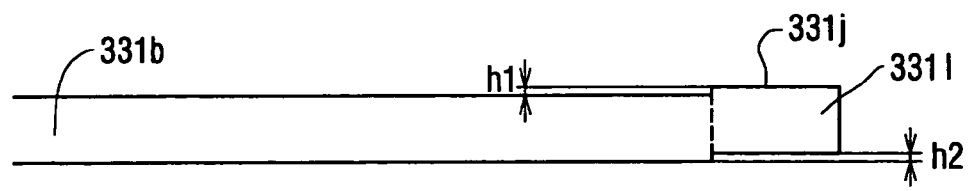
FIG. 27 is an enlarged view illustrating the vicinity of the end of the segment of FIG. 26.

FIG. 26 illustrates the large and small segments 331 and 332 in the third embodiment. The large and small segments 331 and 332 are respectively formed with protrusions 331$k$, 331$l$, 332$k$, and 332$l$ on the faces of the straight portions 331$a$, 331$b$, 332$a$, and 332$b$ which face each other when the turn portions 331$c$ and 332$c$ are aligned in multiple layers. FIG. 27 is an enlarged view near the end of the large segment 331 formed with the protrusion 331$l$. The end of the large segment 331 is protruded, by pressing or the like, toward the side of the other conductor segment, to the bond area of which the bond area 331$j$ of the large segment 331 will be bonded. The offset amount h1 of the protrusion 331$l$ toward that direction on the side of the bond area is equal to the offset amount h2 on the opposite side. (A like arrangement applies to protrusions 331$k$, 332$k$, 332$l$).

Figure 28:
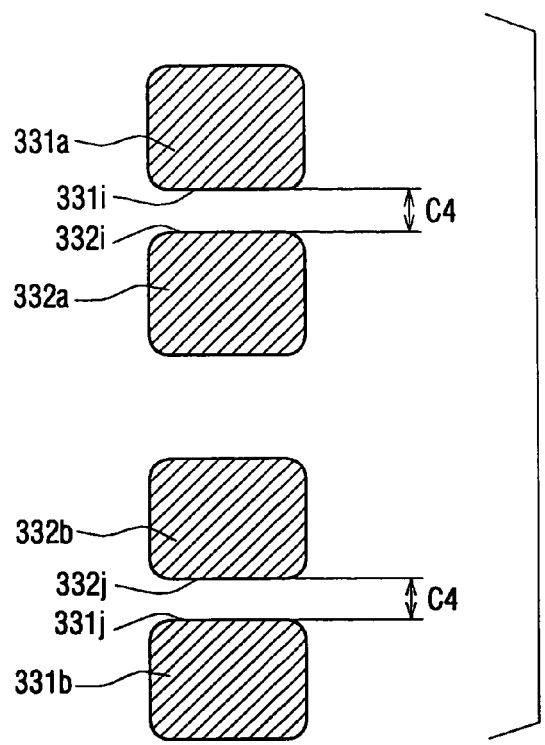
FIG. 28 is a cross-sectional view of the segment taken along the line 28—28 of FIG. 26.
Figure 29:
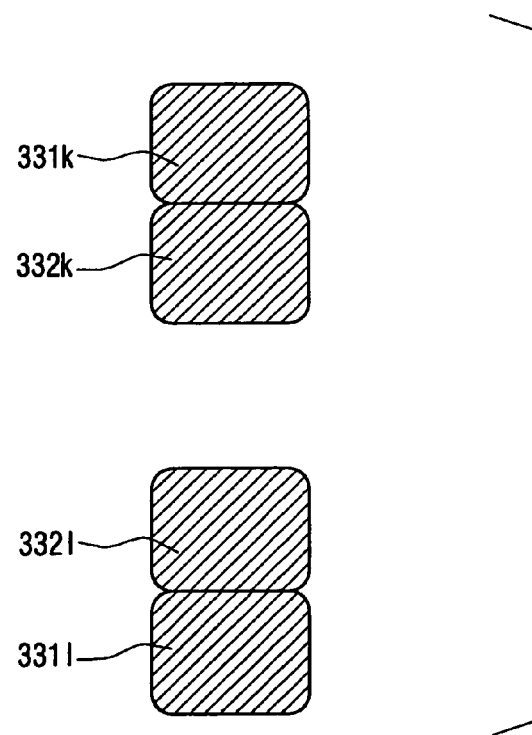
FIG. 29 is a cross-sectional view of the segment taken along the line 29—29 of FIG. 26.

FIG. 28 is a cross-sectional view taken along the line 28—28 of FIG. 26, and FIG. 29 is a cross-sectional view taken along the line 29—29 of FIG. 26. After forming the protrusions 331$k$, 331$l$, 332$k$, and 332$l$, the bond areas 331$i$ and 331$j$, and 332$i$ and 332$j$ are bonded together, whereby a clearance C4 is provided in advance between the large and small segments 331 and 332 as shown in FIG. 28. Thus the same effects as those of the first and second embodiments described above can be expected.

When welding the ends of the conductor segments, the bond areas of the conductor segment ends are in contact with each other very tightly. Therefore, in the present embodiment the provision of segment ends that are offset in mutually approaching directions will also ensure secure welding of the bond areas.

In the embodiment described above, the offset amounts of the protrusions 331k, 331l, 332k, and 332l in opposite directions are identical, but the same effects will be obtained even if they are different.

Figure 30A:
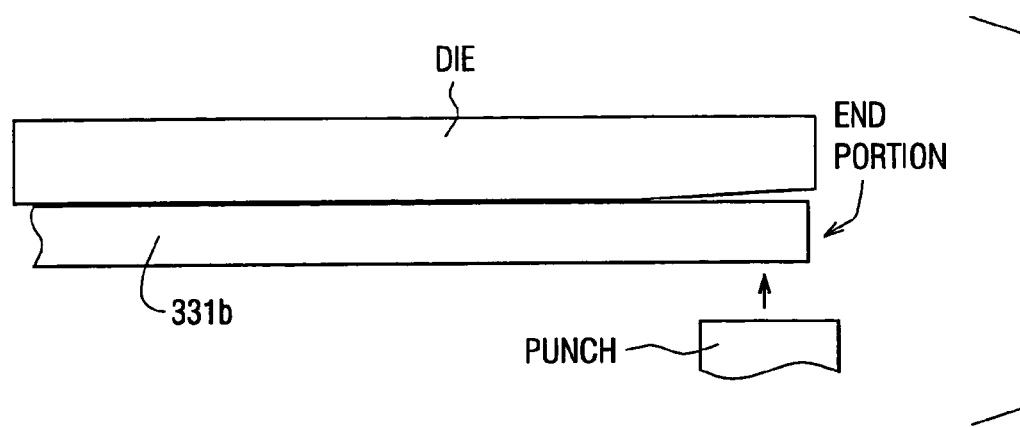
FIG. 30A is a diagram illustrating how to press form a protrusion in a modified example of the third embodiment of the present invention.
Figure 30B:
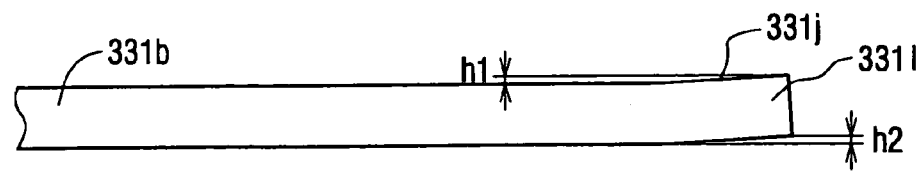
FIG. 30B is a diagram illustrating a view showing the vicinity of the end of the segment after bending.

In the embodiment described above, the clearances in the intersecting portions between conductor segments are secured by offsetting the segment ends to be bonded together in mutually approaching directions. Another option, as a modified example of the third embodiment, is shown in FIGS. 30A and 30B. The example involves pressing the end of the straight portion 331b that is secured on a die in a direction perpendicular to the longitudinal direction of segment 331b with a punch as shown in FIG. 30A. This causes bending in the end of the straight portion 331b of the segment toward the side of the bond area 331j, so as to form a protrusion 331l as shown in FIG. 30B that protrudes toward the other segment to which it is bonded.

(Another Embodiment)

The construction of the first or the second embodiment with indentations in the straight portions of the segments may be combined with the construction of the third embodiment provided with protrusions at the ends of the conductor segments.

Figure 31:
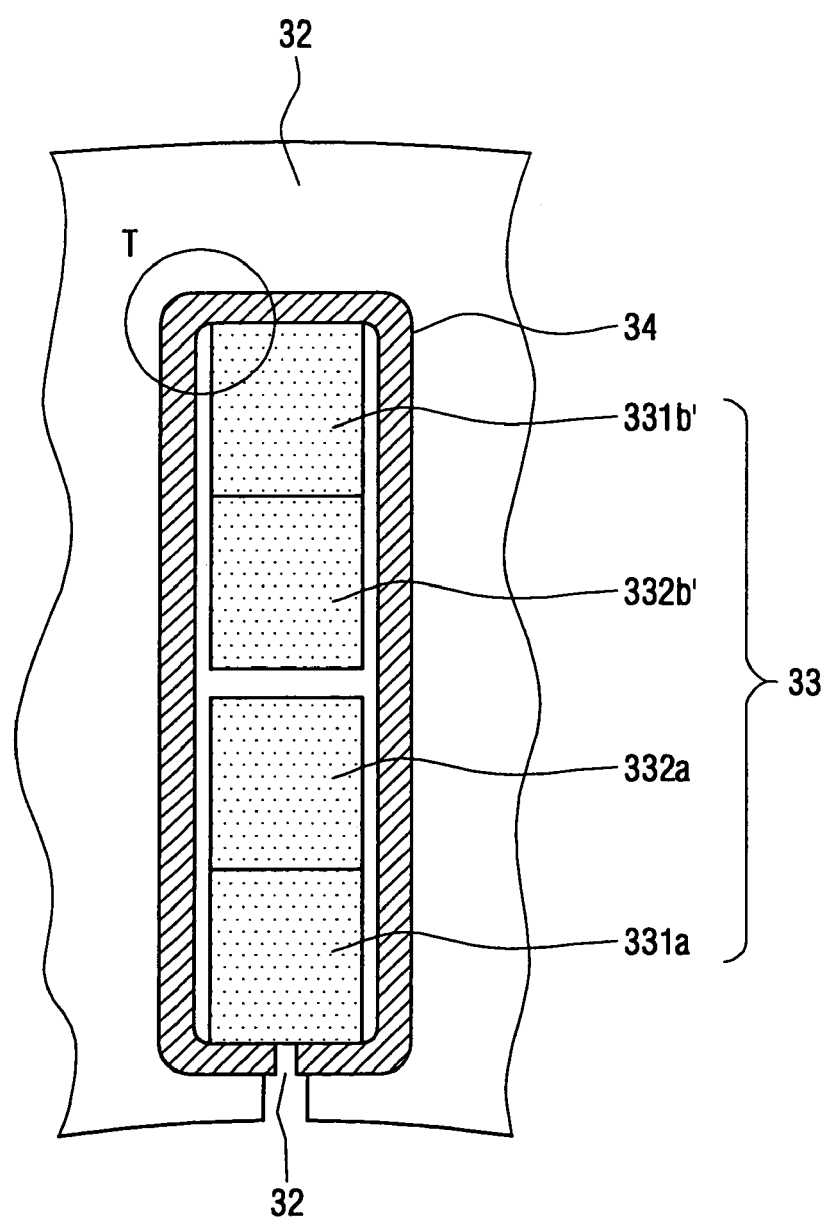
FIG. 31 is a partial cross-sectional view of a stator according to another embodiment of the present invention.
Figure 32:
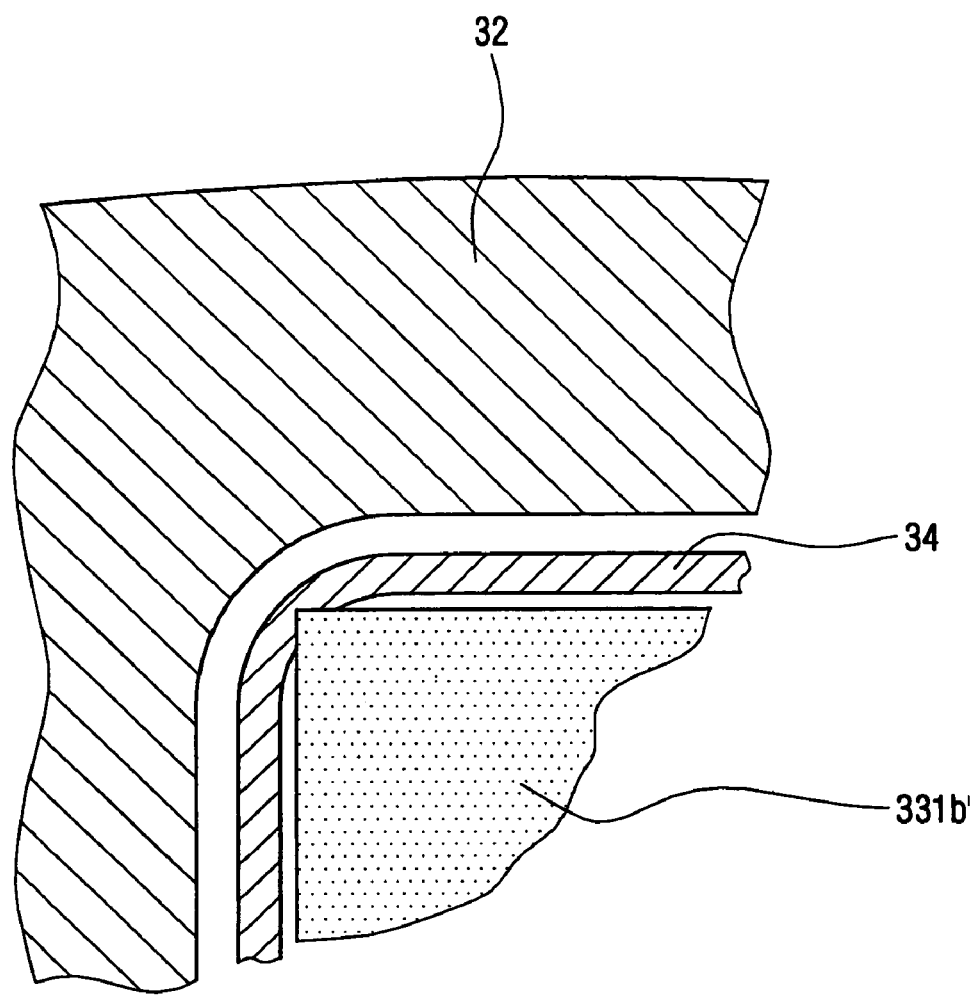
FIG. 32 is an enlarged view of area T of FIG. 31.

For example, in one such embodiment shown in FIG. 31, the conductor segments in the innermost and outermost layers 331a and 331b', respectively, have the protrusions of the third embodiment at their ends, while those in the inner-middle and outer-middle layers 332a and 332b', respectively, have the indentations of the second embodiment in their straight portions. The reason why the indentations of the second embodiment are not employed for the segments in the innermost and outermost layers 331a and 331b' is as follows. The formation of the indentations of the first or second embodiment causes the corner radius of the rectangular cross section of the conductor segments to become smaller as described above. Therefore, if the indentations of the second embodiment are provided to the segments for the innermost and outermost layers 331a and 331b', there is the risk that, when inserting the conductor segments into the slots 35, the relatively sharper corners of the conductor segments 331b' may be caught in the insulator 34 as shown in the enlarged view of FIG. 32, and the conductor segments may become crooked.

In the embodiment shown in FIG. 31, the conductor segments in the innermost and outermost layers 331a and 331b' are provided only with protrusions at their ends toward the bonding direction so as to avoid the reduction in the corner radius of the rectangular cross section of the conductor segments, which is brought about by the formation of indentations. On the other hand, the conductor segments in the inner-middle and outer-middle layers 332a and 332b' are formed with indentations in their straight portions. Thus all the segments can be smoothly inserted into slots 35 without being caught in the insulator 34, and at the same time sufficient clearances necessary for preventing short circuits are provided in the intersecting portions of the conductor segments.

[Advantages of the Invention]

As described above, the stator for the vehicular rotary electric machine as described in the first aspect of the present invention has an indentation formed in a side face of one electrical conductor opposite to another electrical conductor at their intersecting portion. Since the indentation has a depth gradually increasing towards the end thereof, a sufficient clearance is secured between the electrical conductors in their intersecting portion near the ends, where the insulation films are liable to be damaged by heat at the time of welding. Electrical insulation is thereby ensured, and the cooling efficiency at the coil end is improved.

According to the stator for the vehicular rotary electric machine according to the second aspect, even when one electrical conductor is twisted at the coil end, its radial thickness is kept small. Therefore, a sufficient clearance is secured between the electrical conductors, which ensures electrical insulation while improving the cooling efficiency at the coil end.

According to the stator for the vehicular rotary electric machine according to the third aspect of the invention, the radial indentation is formed in its side face that opposes the other one in a skewed fashion. Therefore, even when one electrical conductor is twisted, its radial thickness is kept small. Accordingly, a sufficient clearance is secured between the electrical conductors, which ensures electrical insulation while improving the cooling efficiency at the coil end.

According to the stator for the vehicular rotary electric machine according to a fourth aspect of the invention, the radial indentation is formed in its side face that is brought substantially parallel in a face-to-face relationship with the side face of the other one by twisting back the electrical conductor. Accordingly, even when one electrical conductor is twisted, its radial thickness is kept small. Therefore, a sufficient clearance is secured between electrical conductors, which ensures electrical insulation while improving the cooling efficiency at the coil end.

According to the stator for the vehicular rotary electric machine according to the fifth aspect of the invention, the end of the one electrical conductor at the coil end is formed with a protrusion protruding towards the bond area of the other electrical conductor, so that the other portions of the one electrical conductor are kept apart from the other electrical conductor other than the end to be bonded to the other electrical conductor to provide a sufficient clearance therebetween. Electrical insulation is thereby ensured, and the cooling efficiency at the coil end is improved.

According to the stator for the vehicular rotary electric machine according to the sixth aspect, since the protrusion is formed by offsetting the end of the one electrical conductor toward the bond area of the other electrical conductor by pressing or the like, the end of electrical conductor is brought closer to the bond area of the other electrical conductor, while the other parts of the electrical conductors other than the end are kept apart from the other electrical conductor.

According to the stator for the vehicular rotary electric machine according to the seventh aspect of the invention since the protrusion is formed by bending the end of the one electrical conductor toward the bond area of the other electrical conductor by pressing or the like, the end of the one electrical conductor is brought closer to the bond area of the other electrical conductor. The effect of this is that the other parts of the electrical conductors, other than the particular end, are kept apart from the other electrical conductor.

According to the stator for the vehicular rotary electric machine according to the eighth aspect of the invention, since the one electrical conductor accommodated in at least one layer in the slots is formed with a protrusion at its end that includes a bond area to be bonded to the other radially adjacent electrical conductor at the coil end, the electrical conductor protrusion of the one electrical conductor protruding toward the bond area of the other electrical conductor is kept apart from the other electrical conductor except its end which will be bonded to the other electrical conductor, so as to provide a sufficient clearance therebetween. Electrical insulation is thereby ensured, and the cooling efficiency at the coil end is improved.

On the other hand, the one electrical conductor accommodated in at least one of the other layers in the slots intersects the other radially adjacent electrical conductor at the coil end at one point or more and is formed with a radial indentation in its side face opposite to the other electrical conductor at any of its intersecting portions. Therefore, a sufficient clearance is provided between the electrical conductors in the intersecting portion. Electrical insulation is thereby ensured, and the cooling efficiency at the coil end is also improved.

According to the stator for the vehicular rotary electric machine according to the ninth aspect of the invention, the one electrical conductor in the innermost or outermost layer of the slots is formed with, at its end, a protrusion protruding towards the other electrical conductor but with no indentations. Indentations cause the edges of the electrical conductor to become sharper. Therefore, there is no risk of electrical conductors being caught in the insulation material and no risk of the conductors becoming crooked when being inserted into the slots. They can thus be smoothly inserted into the slots.

According to the manufacturing method of the stator for the vehicular rotary electric machine according to the tenth aspect of the invention, radially adjoining electrical conductors are formed with indentations in their side faces such that these indentations cross each other with a face-to-face relationship. Therefore, the radial thickness of the electrical conductors in their intersecting portions is made smaller, whereby clearances between electrical conductors are readily and reliably secured.

According to the manufacturing method of the stator for the vehicular rotary electric machine according to the eleventh aspect of the invention, since the indentation formed in the one electrical conductor has a depth gradually increasing towards the end, a sufficient clearance is secured between the electrical conductors in the intersecting portion near the ends. Electrical insulation is thereby ensured, and the cooling efficiency at the coil end is improved. Also, even when the electrical conductor has a small radius in the corners of the rectangular cross section, or even when the conductor segment has a large width, the indentation is readily and reliably secured with a sufficient depth near the end of the electrical conductor.

According to the manufacturing method of the stator for the vehicular rotary electric machine according to the twelfth aspect of the invention, even when the electrical conductors are twisted, the opposing indentations are made substantially parallel to each other by twisting back the electrical conductors in the intersecting portions. Accordingly, the radial thickness is kept small, and sufficient clearances are secured between electrical conductors at their intersecting portions.

It should be understood that the present invention is not limited to the embodiments and advantages described above and that various modifications may be made without departing from the spirit or scope of the invention.

What is claimed is:

1. A stator for a vehicular rotary electric machine, comprising:
a stator core having a plurality of slots; and
a multi-phase stator winding constructed of a plurality of electrical conductors connected together, said electrical conductors being accommodated radially side-by-side within said slots and electrically insulated from each other, and having conductor ends extending to an outside of said slots and being bonded together to form a coil end, wherein
a first electrical conductor at said coil end is arranged to intersect a second electrical conductor at at least one point, the second electrical conductor adjoining the first electrical conductor in a radial direction, and a radial indentation is formed in a side face of the first electrical conductor opposite to the second electrical conductor at least at one intersecting point between the adjacent electrical conductors, the indentation having a depth that increases toward one of the first electrical conductor.

2. A stator for a vehicular rotary electric machine, comprising:
a stator core having a plurality of slots; and
a multi-phase stator winding constructed of a plurality of electrical conductors connected together, said electrical conductors being accommodated radially side-by-side within said slots and electrically insulated from each other, and having conductor ends extending to an outside of said slots and being bonded together to form a coil end, wherein
a first electrical conductor at said coil end has a twisted portion and is arranged to be mounted in said stator core to intersect a second electrical conductor at at least one point along the twisted portion, the second electrical conductor adjoining the first electrical conductor in a radial direction, and
a side face of the first electrical conductor defines a radial indentation opposite to the second electrical conductor at any intersecting points.

3. A stator for a vehicular rotary electric machine, comprising:
a stator core having a plurality of slots; and
a multi-phase stator winding constructed of a plurality of electrical conductors connected together, said electrical conductors being accommodated radially side-by-side within said slots and electrically insulated from each other, and having conductor ends extending to an outside of said slots and being bonded together to form a coil end, wherein
a first electrical conductor at the coil end has a bond area end to be bonded to a second electrical conductor, the second electrical conductor adjoining the first electrical conductor in a radial direction, said bond area end being provided with a protrusion protruding toward a bond area of the second electrical conductor.

4. A stator for a vehicular rotary electric machine, comprising:
a stator core having a plurality of slots; and
a multi-phase stator winding constructed of a plurality of electrical conductors connected together, said electrical conductors being accommodated radially side-by-side within said slots and electrically insulated from each other, and having conductor ends extending to an outside of said slots and being bonded together to form a coil end, wherein
a first electrical conductor accommodated in at least one layer in said slots is formed with a protrusion at an end that includes a bond area to be bonded to a second radially adjacent electrical conductor at said coil end, and
a third electrical conductor accommodated in at least one of the other layers in said slots crosses the second radially adjacent electrical conductor at said coil end at at least one point and is formed with a radial indentation in a side face opposite to the second electrical conductor at any of the at least one point.

5. A stator for a vehicular rotary electric machine, comprising:
- a stator core having a plurality of slots at least open to both axial end of the stator core;
- a multi-phase stator winding wound on the stator core, the multi-phase stator winding having a plurality of straight portions accommodated in the slots and a plurality of coil ends protruding from the both ends of the stator core toward the axial direction to connect two straight portions accommodated in different slots, the coil ends being arranged in a layered manner with respect to a radial direction, and the coil ends belonging to one of the layers being arranged to cross the other coil ends belonging to a radially adjacent layer, wherein the coil ends include a narrowed coil end having a radially narrowed portion where a radial width is narrower than that of the straight portion, the radial width of the radially narrowed portion being gradually narrowed toward an axial end of the narrowed coil end.

* * * * *